United States Patent
Mukherjee et al.

(10) Patent No.: US 11,140,713 B2
(45) Date of Patent: Oct. 5, 2021

(54) PREEMPTIVE RETRANSMISSIONS ON LISTEN-BEFORE-TALK CELLS

(71) Applicant: Telefonaktiebolaget L M Ericsson (publ), Stockholm (SE)

(72) Inventors: Amitav Mukherjee, Santa Clara, CA (US); Jung-Fu Cheng, Fremont, CA (US); Sorour Falahati, Stockholm (SE); Havish Koorapaty, Saratoga, CA (US); Daniel Larsson, Vallentuna (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 764 days.

(21) Appl. No.: 14/962,503

(22) Filed: Dec. 8, 2015

(65) Prior Publication Data

US 2016/0174259 A1 Jun. 16, 2016

Related U.S. Application Data

(60) Provisional application No. 62/090,164, filed on Dec. 10, 2014.

(51) Int. Cl.
*H04W 74/08* (2009.01)
*H04W 72/04* (2009.01)
(Continued)

(52) U.S. Cl.
CPC .......... *H04W 74/0816* (2013.01); *H04L 1/08* (2013.01); *H04L 1/189* (2013.01); *H04L 1/1816* (2013.01);
(Continued)

(58) Field of Classification Search
None
See application file for complete search history.

(56) References Cited

U.S. PATENT DOCUMENTS

| 9,344,986 B2* | 5/2016 | Kim | H04W 56/0045 |
| 2008/0068979 A1* | 3/2008 | Visotsky | H04L 1/1825 |
| | | | 370/208 |

(Continued)

FOREIGN PATENT DOCUMENTS

GB 2507528 A 5/2014

OTHER PUBLICATIONS

Wu, Xiuchao, et al., "PMC: An Energy Efficient Event Transport Service For Wireless Sensor Network," IEEE ntemational Conference on Communications, vol. 1, Jun. 2006, Istanbul, Turkey, IEEE, pp. 355-360.*

(Continued)

*Primary Examiner* — Steve R Young
(74) *Attorney, Agent, or Firm* — Withrow & Terranova, PLLC

(57) ABSTRACT

Systems and methods are described herein relating to preemptive retransmission of a transport block in successive subframes on, e.g., a Listen-Before-Talk (LBT) cell. Embodiments of a method of operation of a radio node of a cellular communications network are disclosed. The radio node serves an LBT cell. In some embodiments, the method of operation of the radio node comprises transmitting a transport block in a first subframe on the LBT cell and retransmitting the transport block in a second subframe (e.g., on the LBT cell), where the second subframe is adjacent, in time, to the first subframe. In embodiments in which the retransmission of the transport block is on the LBT cell (or another LBT cell), the time span of a transmission burst can be extended to a maximum allowed burst duration.

34 Claims, 16 Drawing Sheets

(51) Int. Cl.
  *H04L 5/14*   (2006.01)
  *H04L 1/18*   (2006.01)
  *H04L 1/08*   (2006.01)
(52) U.S. Cl.
  CPC .......... *H04L 1/1819* (2013.01); *H04L 5/1469* (2013.01); *H04W 72/042* (2013.01); *H04W 74/085* (2013.01)

(56) References Cited

U.S. PATENT DOCUMENTS

| | | | | |
|---|---|---|---|---|
| 2009/0010198 | A1* | 1/2009 | Boariu | H04L 1/1854 370/315 |
| 2012/0057560 | A1 | 3/2012 | Park et al. | |
| 2013/0336267 | A1* | 12/2013 | Li | H04L 1/1854 370/329 |
| 2015/0071220 | A1* | 3/2015 | Luo | H04L 5/001 370/329 |
| 2015/0092645 | A1* | 4/2015 | Tabet | H04L 1/1825 370/311 |
| 2015/0098490 | A1* | 4/2015 | Ro | H04B 1/7143 375/133 |
| 2015/0282130 | A1* | 10/2015 | Webb | H04L 1/08 370/329 |
| 2015/0365830 | A1* | 12/2015 | Wei | H04J 3/1694 370/280 |
| 2016/0088642 | A1* | 3/2016 | Yang | H04W 24/08 455/451 |
| 2017/0238311 | A1* | 8/2017 | Hooli | H04W 72/0446 370/329 |

OTHER PUBLICATIONS

Author Unknown, "Technical Specification Group Radio Access Network; Evolved Universal Terrestrial Radio Access (E-UTRA); Physical channels and modulation (Release 11)," Technical Specification 36.211, Version 11.4.0, 3GPP Organizational Partners, Sep. 2013, 120 pages.
Author Unknown, "Technical Specification Group Radio Access Network; Evolved Universal Terrestrial Radio Access (E-UTRA); Multiplexing and channel coding (Release 12)," Technical Specification 36.212, Version 12.2.0, 3GPP Organizational Partners, Sep. 2014, 89 pages.
Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.
Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
Wu, Xiuchao, et al., "PMC: An Energy Efficient Event Transport Service for Wireless Sensor Network," IEEE International Conference on Communications, vol. 1, Jun. 2006, Istanbul, Turkey, IEEE, pp. 355-360.
International Search Report and Written Opinion for International Patent Application No. PCT/IB2015/059486, dated Feb. 25, 2016, 11 pages.
Examination Report for European Patent Application No. 15816885. 6, dated Mar. 5, 2020, 4 pages.

* cited by examiner

PREEMPTIVE RETRANSMISSIONS ON LISTEN-BEFORE-TALK CELLS

RELATED APPLICATIONS

This application claims the benefit of provisional patent application Ser. No. 62/090,164, filed Dec. 10, 2014, the disclosure of which is hereby incorporated herein by reference in its entirety.

TECHNICAL FIELD

This disclosure pertains to preemptive retransmissions in Listen-Before-Talk (LBT) systems.

BACKGROUND

Licensed Assisted Access (LAA) facilitates Third Generation Partnership Project (3GPP) Long Term Evolution (LTE) equipment to operate in the unlicensed 5 gigahertz (GHz) radio spectrum. The unlicensed 5 GHz spectrum is used as a complement to the licensed spectrum. Devices can connect in the licensed spectrum (using a Primary Cell (PCell)) and use Carrier Aggregation (CA) to benefit from additional transmission capacity in the unlicensed spectrum (using a Secondary Cell (SCell)). To reduce the changes involved for aggregating licensed and unlicensed spectrum, the LTE frame timing in the PCell is simultaneously used in the SCell.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) procedure needs to be applied. Today, the unlicensed 5 GHz spectrum is mainly used by equipment implementing the IEEE 802.11 Wireless Local Area Network (WLAN) standard. This standard is known under its marketing brand "Wi-Fi." In many regions there is also a constraint on the maximum duration of a single transmission burst in the unlicensed spectrum, such as 4 milliseconds (ms) or 10 ms.

LTE

LTE uses Orthogonal Frequency Division Multiplexing (OFDM) in the downlink and Discrete Fourier Transform (DFT) spread OFDM (DFT-spread OFDM), which is also referred to as single-carrier Frequency Division Multiple Access (FDMA), in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of Single Carrier FDMA (SC-FDMA) symbols in the time domain as OFDM symbols in the downlink.

In the time domain, LTE downlink transmissions are organized into radio frames of 10 ms, each radio frame consisting of ten equally-sized subframes of length $T_{SUBFRAME}=1$ ms as shown in FIG. 2. For normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 (Rel-11) onwards, the above described resource assignments can also be scheduled on the enhanced Physical Downlink Control Channel (EPDCCH). For Release 8 (Rel-8) to Release 10 (Rel-10), only the Physical Downlink Control Channel (PDCCH) is available. The reference symbols shown in FIG. 3 are the Cell specific Reference Symbols (CRSs) and are used to support multiple functions including fine time and frequency synchronization and channel estimation for certain transmission modes.

PDCCH and EPDCCH

The PDCCH/EPDCCH is used to carry Downlink Control Information (DCI) such as scheduling decisions and power control commands. More specifically, the DCI includes:

Downlink scheduling assignments, including Physical Downlink Shared Channel (PDSCH) resource indication, transport format, Hybrid Automatic Repeat Request (HARQ) information, and control information related to spatial multiplexing (if applicable). A downlink scheduling assignment also includes a command for power control of the Physical Uplink Control Channel (PUCCH) used for transmission of HARQ acknowledgements in response to downlink scheduling assignments.

Uplink scheduling grants, including Physical Uplink Shared Channel (PUSCH) resource indication, transport format, and HARQ-related information. An uplink scheduling grant also includes a command for power control of the PUSCH.

Power control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the (E)PDCCH is selected by adapting the resource usage for the (E)PDCCH, to match the radio channel conditions.

CA

The LTE Rel-10 standard supports bandwidths larger than 20 megahertz (MHz). One important aspect of LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least the possibility to have, the same structure as a Rel-8 carrier. CA is illustrated in FIG. 4. A CA-capable User Equipment device (UE) is assigned a PCell which is always activated, and one or more SCells which may be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of CA is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically. Note that cross-subframe cross-carrier scheduling of PDSCH is not supported in Rel-11 CA, i.e., the (E)PDCCH grant in a particular subframe applies to a PDSCH allocation in that same Transmit Time Interval (TTI).

WLAN

In typical deployments of WLAN, Carrier Sense Multiple Access with Collision Avoidance (CSMA/CA) is used for medium access. The channel is sensed to perform a Clear Channel Assessment (CCA), and a transmission is initiated only if the channel is declared as Idle. In case the channel is declared as Busy, the transmission is essentially deferred until the channel is deemed to be Idle. When the range of several Access Points (APs) using the same frequency overlap, transmissions related to one AP might be deferred in case a transmission on the same frequency to or from another AP which is within range can be detected. If several APs are within range, they will have to share the channel in time, and the throughput for the individual APs may be severely degraded. A general illustration of the LBT mechanism is shown in FIG. 5.

LAA to Unlicensed Spectrum Using LTE

Up to now, the spectrum used by LTE is dedicated to LTE (i.e., is licensed spectrum). This has the advantage that the LTE system does not need to care about the coexistence issue and the spectrum efficiency can be maximized. However, the spectrum allocated to LTE is limited and, as such, cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. As used herein, a SCell in unlicensed spectrum is denoted as a LAA SCell. In the case of cross-carrier scheduling, PDSCH and PUSCH grants for the LAA SCell are transmitted on the PCell.

Due to the LBT procedure for an LAA SCell, it is desirable to occupy the channel for the maximum allowed duration (i.e., the maximum occupancy time) since it is uncertain when the next transmission opportunity will be obtained. However, the LAA SCell may have to release the channel prematurely if there is insufficient data in its downlink buffer. As such, there is a need for systems and methods for addressing this problem along with resulting issues that arise due to prematurely releasing the channel.

SUMMARY

Systems and methods are described herein relating to preemptive retransmission of a transport block in successive subframes on, e.g., a Listen-Before-Talk (LBT) cell. Embodiments of a method of operation of a radio node of a cellular communications network are disclosed. The radio node serves an LBT cell. In some embodiments, the method of operation of the radio node comprises transmitting a transport block in a first subframe on the LBT cell and retransmitting the transport block in a second subframe (e.g., on the LBT cell), where the second subframe is adjacent, in time, to the first subframe. In embodiments in which the retransmission of the transport block is on the LBT cell (or another LBT cell), the time span of a transmission can be extended to a maximum allowed burst duration. Further, in some embodiments in which the LBT cell is a Licensed Assisted Access (LAA) Secondary Cell (SCell), the retransmission enables Hybrid Automatic Repeat Request (HARQ) Round-Trip Time (RTT) to be reduced.

In some embodiments, retransmitting the transport block in the second subframe comprises preemptively retransmitting the transport block in the second subframe without first receiving an indication that retransmission of the transport block transmitted in the first subframe is needed. Further, in some embodiments, preemptively retransmitting the transport block in the second subframe comprises preemptively retransmitting the transport block in the second subframe according to a HARQ procedure.

In some embodiments, retransmitting the transport block in the second subframe comprises transmitting a redundancy version of the transport block in the second subframe that is different than that transmitted in the first subframe.

In some embodiments, retransmitting the transport block in the second subframe comprises retransmitting the transport block in the second subframe using time-frequency resources within the second subframe that are the same as time-frequency resources used for transmission of the transport block within the first subframe.

In some embodiments, retransmitting the transport block in the second subframe comprises retransmitting the transport block in the second subframe using time-frequency resources within the second subframe that are different than time-frequency resources used for transmission of the transport block within the first subframe.

In some embodiments, the radio node is a radio access node, transmitting the transport block in the first subframe comprises transmitting a downlink transport block to a wireless device in the first subframe, and retransmitting the transport block in the second subframe comprises retransmitting the downlink transport block to the wireless device in the second subframe. Further, in some embodiments, the method further comprises transmitting a single resource allocation grant for transmission of the downlink transport block in the first subframe and retransmission of the downlink transport block in the second subframe. Still further, in some embodiments, transmitting the single resource allocation grant comprises transmitting the single resource allocation grant on a cell other than the LBT cell. Still further, in some embodiments, the cell is a Primary Cell (PCell) with respect to downlink Carrier Aggregation (CA) for the wireless device, and the LBT cell is a SCell with respect to downlink CA for the wireless device. Still further, in some embodiments, the PCell operates in a licensed frequency spectrum.

In some embodiments, the radio node is a wireless device, transmitting the transport block in the first subframe comprises transmitting an uplink transport block to a radio access node in the first subframe, and retransmitting the transport block in the second subframe comprises retransmitting the uplink transport block to the radio access node in the second subframe. Further, in some embodiments, the method further comprises receiving a single resource allocation grant for transmission of the uplink transport block in the first subframe and retransmission of the uplink transport block in the second subframe. Still further, in some embodiments, receiving the single resource allocation grant comprises receiving the single resource allocation grant on a cell other than the LBT cell. Still further, in some embodiments, the cell is a PCell with respect to downlink CA for the wireless device, and the LBT cell is a SCell with respect to downlink CA for the wireless device. Still further, in some embodiments, the PCell operates in a licensed frequency spectrum.

In some embodiments, the single resource allocation grant for transmission of the transport block in the first subframe and retransmission of the transport block in the second subframe comprises an indication of a sequence of redundancy versions of the transport block that the wireless device is to expect in successive subframes comprising the first subframe and the second subframe.

In some embodiments, the single resource allocation grant for transmission of the transport block in the first subframe and retransmission of the transport block in the second subframe is comprised in a Downlink Control Information (DCI) message that is scrambled with a Radio Network Temporary Identifier (RNTI) that indicates that preemptive retransmissions will be used for the single resource allocation grant. Further, in some embodiments, a number of preemptive transmissions in successive subframes for the single resource allocation grant is predefined.

In some embodiments, the single resource allocation grant for transmission of the transport block in the first subframe and retransmission of the transport block in the second subframe comprises an indication that the single resource allocation grant is valid for multiple successive subframes comprising the first subframe and the second subframe.

In some embodiments, both transmission of the transport block in the first subframe and retransmission of the transport block in the second subframe are scheduled by a single resource allocation grant that is provided on a cell other than the LBT cell, the cell on which the single resource allocation is provided and the LBT cell are Time Division Duplexing (TDD) cells in which transmissions in a particular subframe on the LBT cell are normally scheduled by resource allocation grants transmitted in a corresponding downlink subframe on the cell, and the second subframe is a subframe on the LBT cell on which transmissions could normally not be scheduled because a corresponding subframe on the cell is an uplink subframe.

In some embodiments, retransmitting the transport block comprises retransmitting the transport block in one or more additional subframes on the LBT cell, where the one or more additional subframes are adjacent, in time, to one another and the one or more additional subframes comprise the second subframe that is adjacent, in time, to the first subframe. Still further, in some embodiments, the one or more additional subframes further comprise a third subframe that is adjacent, in time, to the second subframe.

In some embodiments, the number of the one or more additional subframes is variable. Further, in some embodiments, the number of the one or more additional subframes is defined by higher-layer signaling.

In some embodiments, the one or more additional subframes comprise two or more additional subframes, and retransmitting the transport block in the one or more additional subframes comprises transmitting a different redundancy version of the transport block in each of the two or more additional subframes.

In some embodiments, retransmitting the transport block in the one or more additional subframes comprises retransmitting the transport block in the one or more additional subframes on the LBT cell such that transmission on the LBT cell by the radio node reaches a maximum allowed occupancy time for the LBT cell.

In some embodiments, retransmitting the transport block in the second subframe comprises preemptively retransmitting the transport block in the second subframe without first receiving an indication that retransmission of the transport block transmitted in the first subframe is needed when a channel on which the radio node is transmitting would have otherwise been released.

In some embodiments, retransmitting the transport block in the second subframe comprises retransmitting the transport block in the second subframe on the LBT cell. In other embodiments, retransmitting the transport block in the second subframe comprises retransmitting the transport block in the second subframe on a cell other than the LBT cell.

In some embodiments, the LBT cell is an LAA SCell. In other embodiments, the LBT cell is a standalone LBT cell.

Embodiments of a radio node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
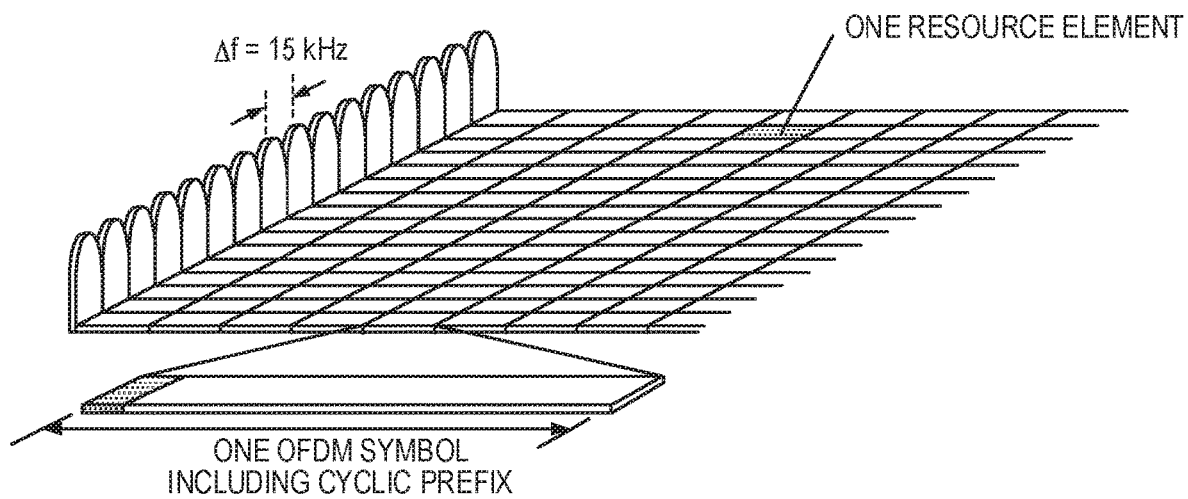
FIG. 1 is a schematic diagram of an example Orthogonal Frequency Division Multiplexing (OFDM) downlink physical resource.
Figure 2:
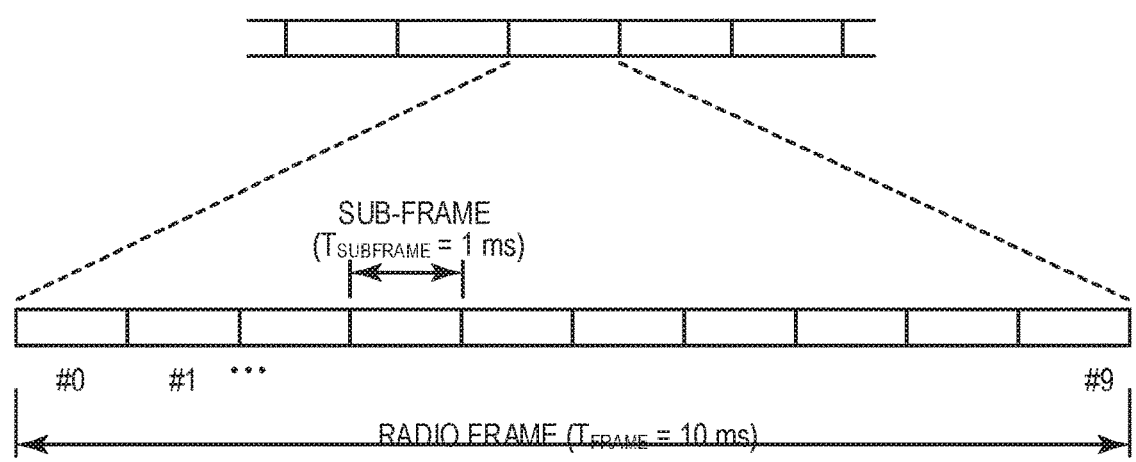
FIG. 2 is a schematic diagram of an example OFDM time-domain structure.
Figure 3:
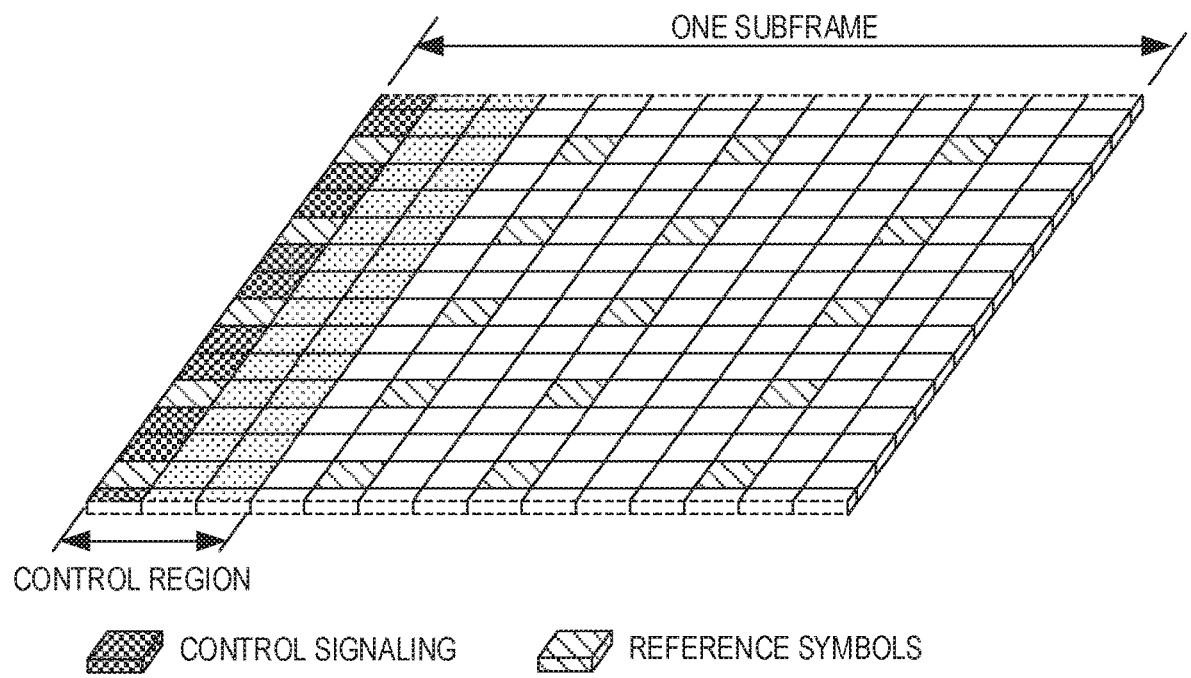
FIG. 3 is a schematic diagram of an example OFDM downlink subframe.
Figure 4:
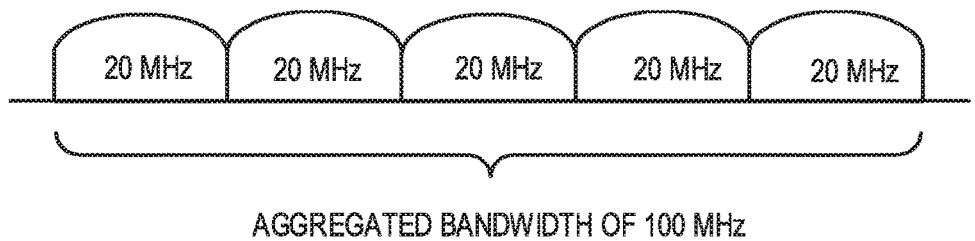
FIG. 4 is a schematic diagram of an example of Carrier Aggregation (CA)
Figure 5:
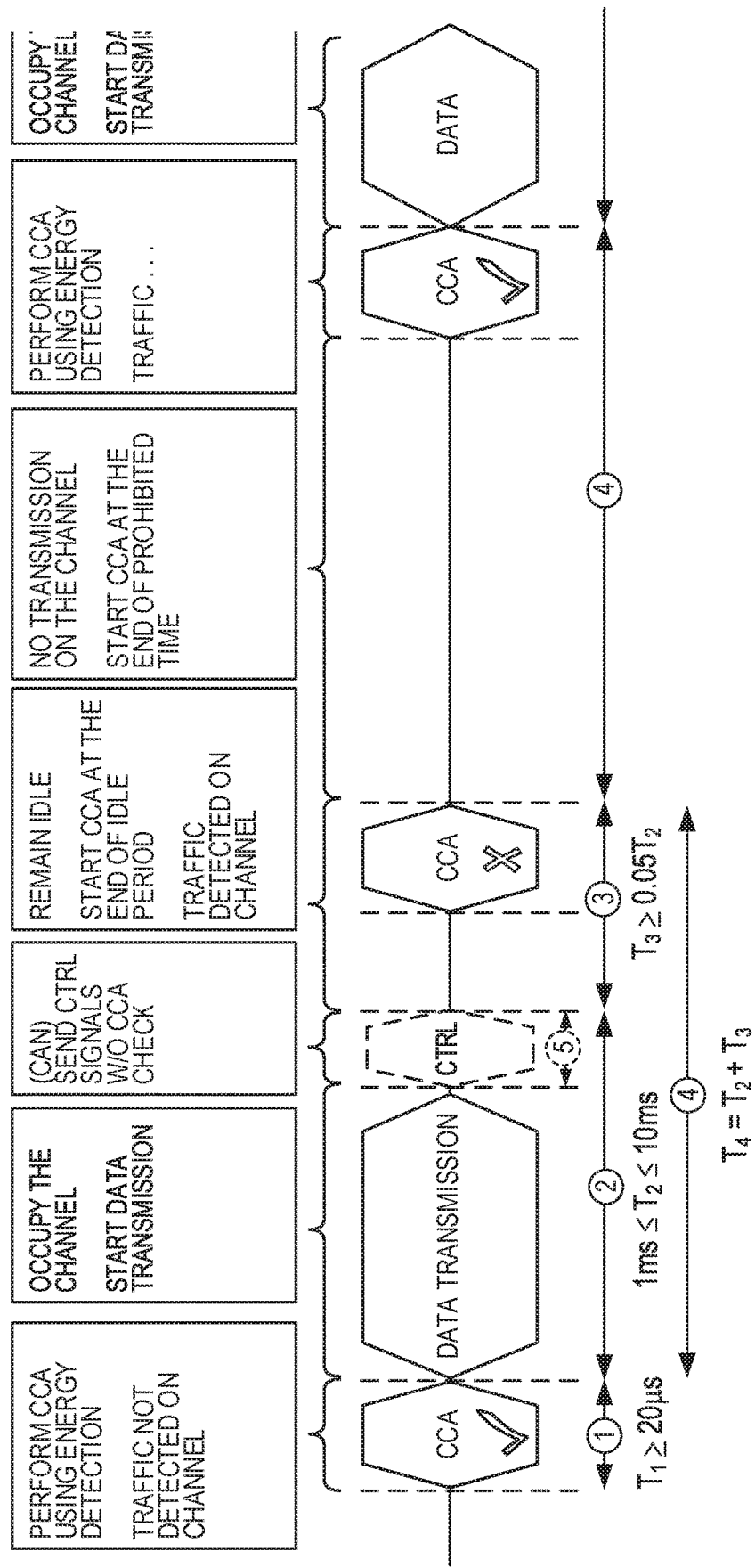
FIG. 5 is a schematic diagram showing of a Listen-Before-Talk (LBT) scheme.
Figure 6:
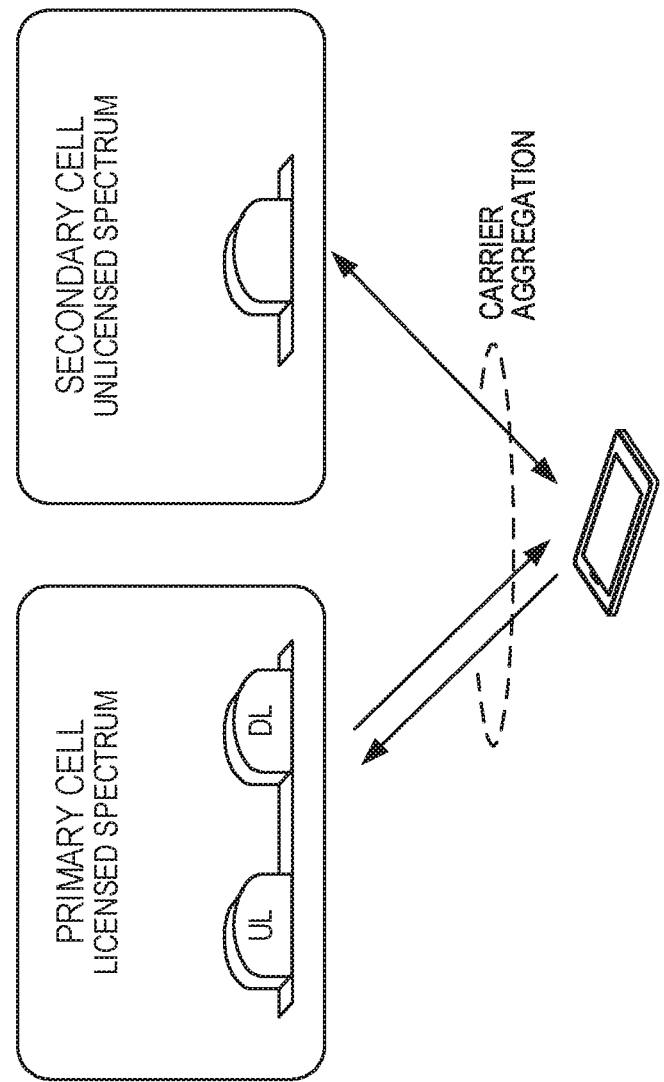
FIG. 6 is a schematic diagram of an example of Licensed Assisted Access (LAA) and unlicensed spectrum using LTE CA.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Wireless Device: As used herein, a "wireless device" is any type of type device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the core network of a cellular communications network/system.

Listen-Before-Talk (LBT): As used herein, "LBT" or an "LBT scheme" is any scheme in which a radio access node or wireless device monitors a channel in a frequency spectrum that requires LBT to determine whether the channel is clear (e.g., performs a Clear Channel Assessment (CCA)) before transmitting on the channel. The description herein focuses on an unlicensed frequency spectrum as the frequency spectrum that requires LBT; however, the frequency spectrum that requires LBT is not limited to an unlicensed frequency spectrum (e.g., the frequency spectrum that requires LBT may alternatively be a license shared frequency spectrum).

LBT Cell: As used herein, an "LBT cell" is a cell that operates on a channel in a frequency spectrum (e.g., an unlicensed frequency spectrum or a license shared frequency spectrum) in which an LBT scheme must be performed before transmitting.

Licensed Assisted Access (LAA) Secondary Cell (SCell): As used herein, an "LAA SCell" is one type of LBT cell. In particular, an "LAA SCell" is a SCell in a LTE network, where the SCell operates in a frequency spectrum in which an LBT scheme must be performed before transmitting.

Standalone LBT Cell: As used herein, a "standalone LBT cell" is one type of LBT cell (e.g., a cell in an LTE network) that operates on its own (i.e., is not a SCell).

Due to the LBT procedure for an LAA SCell, it is desirable to occupy the channel for the maximum allowed duration (i.e., the maximum occupancy time) since it is uncertain when the next transmission opportunity will be obtained. However, the LAA SCell may have to release the channel prematurely if there is insufficient data in its downlink buffer. No guarantees can then be made regarding the Hybrid Automatic Repeat Request (HARQ) Round-Trip Time (RTT) under LBT. In other words, the delay between initial transmissions of new data and retransmissions of the same or different redundancy version cannot currently be predicted for the LAA SCell. This problem is particularly present if the load in the operated unlicensed frequency is high.

Furthermore, the LBT procedure when combined with cross-carrier scheduling on a Time Division Duplexing (TDD) Primary Cell (PCell) implies that certain subframes on the LAA SCell cannot be scheduled even if LBT is successful, depending upon the uplink/downlink configuration of the PCell. This leads to inefficient usage of the unlicensed spectrum under cross-carrier scheduling. Note that cross-subframe cross-carrier scheduling of Physical Downlink Shared Channel (PDSCH) is not supported in Release 11 (Rel-11) Carrier Aggregation (CA), i.e., the (enhanced) Physical Downlink Control Channel ((E)PDCCH) grant in a particular subframe applies to a PDSCH allocation in that same Transmit Time Interval (TTI).

A preemptive retransmission policy is described herein for LBT carriers such as an LAA SCell. For the downlink, a single PDCCH/EPDCCH resource grant is used to indicate the transmission of a PDSCH transport block with a certain redundancy version, and the immediate retransmission of that transport block with different redundancy versions in the next subframe(s). The time-frequency allocation of the preemptive retransmissions in subsequent subframes may be identical to the initial grant, or derived from the initial grant based on a predefined rule. This disclosure also applies to multiple transport blocks in one TTI for the case of spatial multiplexing. The grants for such preemptive retransmissions may be sent using a modified Downlink Control Information (DCI) message, or be scrambled by a new Radio Network Temporary Identifier (RNTI), or be configured semi-statically using higher-layer signaling.

On the downlink, if the UE successfully decodes the initial transmission of the transport block or a subset of the first and subsequent transmissions over consecutive subframes, it can ignore the remaining redundancy versions, if any.

A similar preemptive retransmission policy is defined for the Physical Uplink Shared Channel (PUSCH) on the uplink. Namely, a single PDCCH/EPDCCH resource grant is used to trigger the transmission of a PUSCH transport block with a certain redundancy version, and the immediate retransmission of that transport block with different redundancy versions in the next subframe(s).

The following advantages have been identified:
  The time span of a transmission burst on the LBT cell can be extended to the maximum allowed burst duration, which improves the unlicensed band usage of LAA.
  The HARQ RTT can be reduced for LAA SCells, since otherwise LBT would be used for sending Acknowledgement/Negative Acknowledgement (ACK/NACK) information and retransmission grants.
  When cross-carrier scheduling is employed by a TDD PCell, the number of SCell subframes that cannot be scheduled by the PCell even after successful LBT is greatly reduced.
  The activation and deactivation of the proposed preemptive retransmission policy is fully configurable and can be disabled during high traffic scenarios.

Here follows a description of the proposed preemptive retransmission policy on LBT cells. For illustration, the details are provided for downlink transmissions on an LAA SCell that is synchronized with a PCell operating on a licensed channel. Other embodiments may include multiple LAA SCells, uplink transmissions on an LAA SCell, or a standalone LBT cell.

Figure 7:
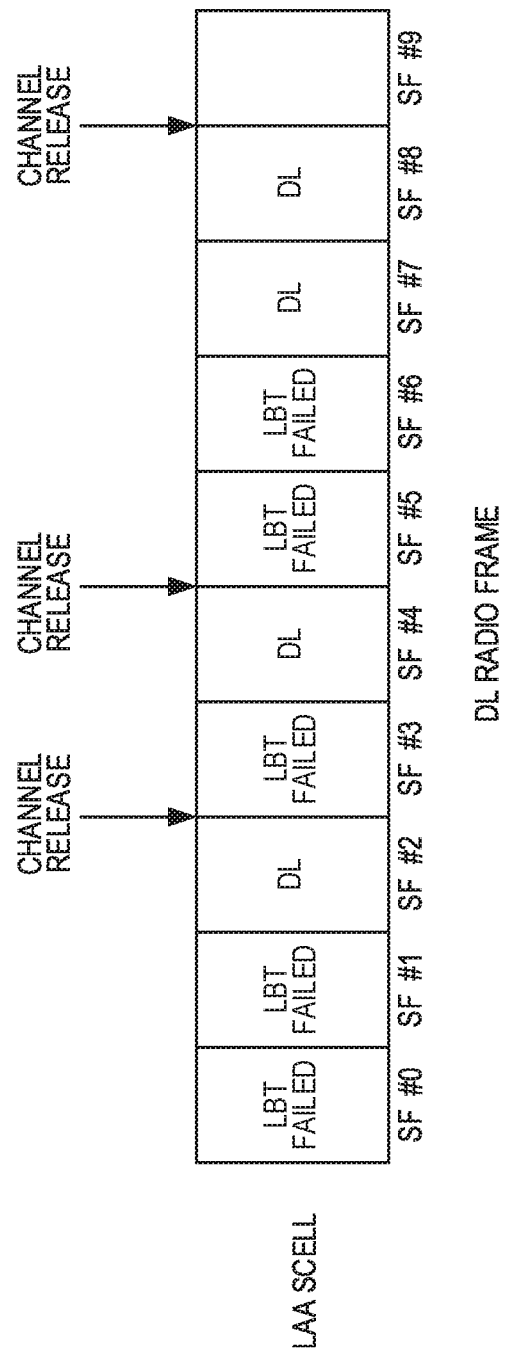
FIG. 7 is a schematic diagram of a downlink frame on LAA Secondary Cell (SCell) with legacy scheduling.

A generic example scenario showing LBT and discontinuous downlink transmission by an LAA SCell with current scheduling mechanism is depicted in FIG. 7, which illustrates a downlink frame on an LAA SCell with legacy scheduling. Assume the maximum allowed duration of a single transmission burst is 3 milliseconds (ms), which is equivalent to three LTE subframes. Different transmission bursts may have different durations depending upon the number of UEs being served and their downlink buffer occupancy. The SCell performs LBT around the start of a subframe boundary if it does not currently occupy the channel.

Figure 8:
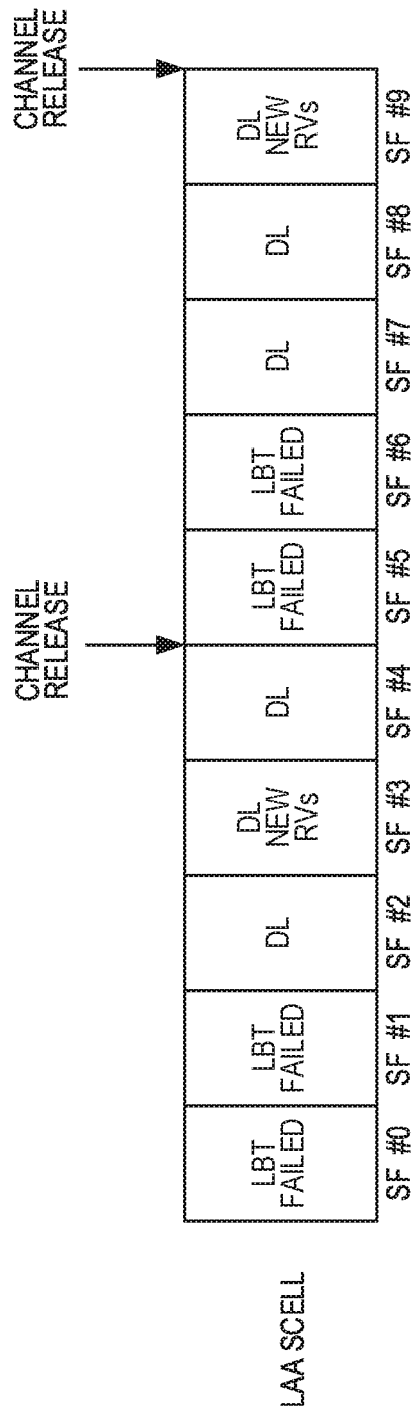
FIG. 8 is a schematic diagram of a preemptive retransmission on a downlink frame of an LAA SCell in accordance with embodiments of the present disclosure.

In accordance with this disclosure, multiple Redundancy Versions (RVs) of a transport block can be transmitted in consecutive subframes based on a single downlink grant, where each RV carries different sets of coded parity bits corresponding to the same codeword or HARQ process. In FIG. 8, which illustrates preemptive retransmission on a downlink frame of an LAA SCell, the resulting SCell transmission is observed and it is seen that two additional subframes are utilized for PDSCH transmission compared to FIG. 7 for the same LBT and traffic assumptions.

Figure 9:
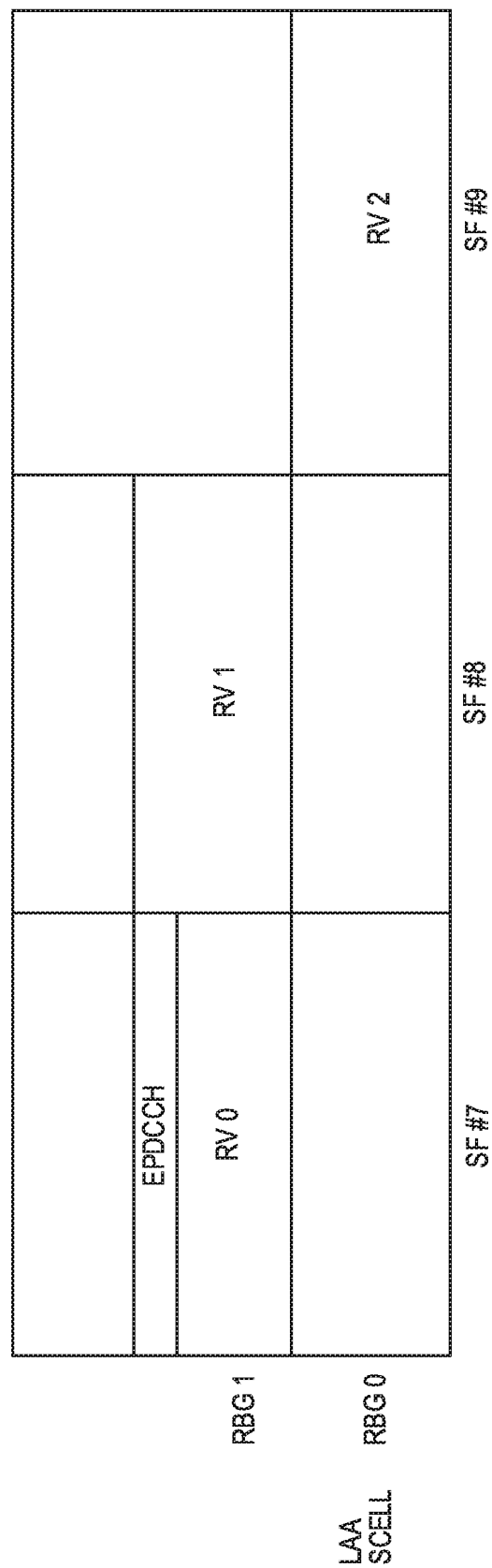
FIG. 9 is a schematic diagram of a frame structure for consecutive transmissions of multiple redundancy versions in accordance with embodiments of the present disclosure.

A more detailed illustration of some embodiments of the present disclosure is shown in FIG. 9, which illustrates consecutive transmissions of multiple RVs, with the scheduling unit assumed to be a Resource Block Group (RBG), where a RBG is a set of consecutive virtual resource blocks. In other embodiments, the resource allocation may consist of distributed virtual resource blocks. As a non-limiting example, a single EPDCCH grant on the LAA SCell is used to indicate three PDSCH transmissions associated with a particular HARQ process spanning three consecutive subframes, with the same Modulation and Coding Scheme (MCS) but different redundancy versions across all three. The third transmission of RV 2 is offset in frequency based on a predefined rule as an example. The number of consecutive transmissions can be variable and configured by higher-layer signaling; for example, the maximum number is limited by either the maximum allowed duration of a burst or the number of available RVs (whichever is smaller). The initial grant may be sent on either the PDCCH or the EPDCCH.

Figure 10:
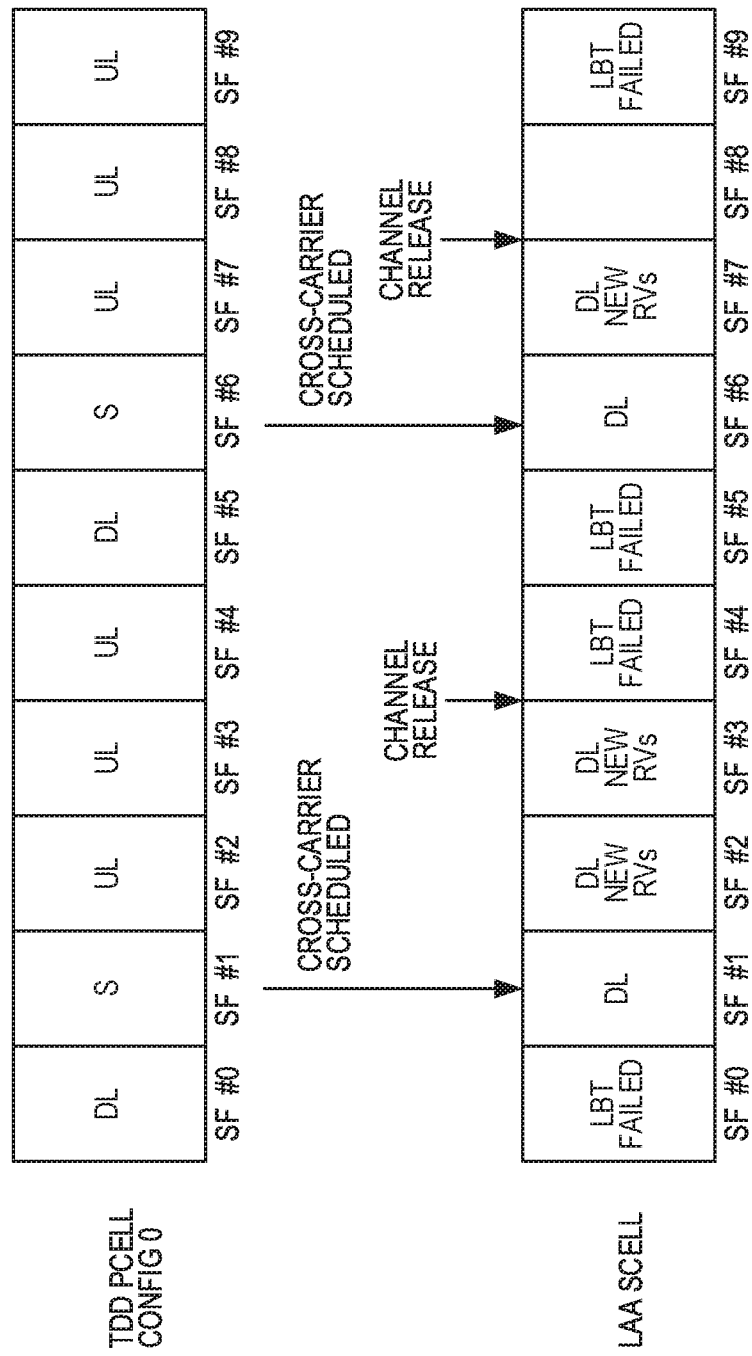
FIG. 10 is a schematic diagram cross-carrier scheduling on a Time Division Duplexing (TDD) Primary Cell (PCell)

FIG. 10 is a schematic diagram of cross-carrier scheduling on a TDD PCell. In FIG. 10, the PCell follows uplink/downlink configuration 0 as an example. With legacy cross-carrier scheduling, subframes #2, #3, #7, and #8 could not have been scheduled on the LAA SCell even if the CCAs at these instants showed the channel to be unoccupied, since these subframes coincide with uplink subframes on the PCell. Some or all of these subframes can still be utilized for downlink transmission. Similar advantages can be obtained for different TDD PCell uplink/downlink configurations where the set of available downlink subframes on the LAA SCell after LBT is not a subset of the downlink or special subframes of the PCell. The HARQ ACK timings on the LAA SCell can follow Release 12 (Rel-12) TDD-Frequency Division Duplexing (FDD) CA timings, for example.

In a further embodiment, cross-carrier scheduling is used on the enhanced International Mobile Telecommunications Advanced (eIMTA) PCell, which contains uplink subframes, downlink subframes, and flexible subframes. The flexible subframe can be either a downlink or an uplink subframe which is indicated by dynamic signaling, i.e., PDCCH/EPDCCH grant. With legacy cross-carrier scheduling, similarly as the TDD PCell case, some subframes may not be scheduled on the LAA SCell even if the CCAs at these instants show the channel to be unoccupied, since these subframes coincide with the eIMTA PCell uplink subframes or the flexible subframes dynamically configured to be uplink. Some or all of these subframes can still be utilized for downlink transmission. The HARQ ACK timings on the LAA SCell can follow Rel-12 TDD-FDD CA timings, for example. One example of defining the HARQ timing is to always base it on the last subframe in the scheduled transmission occasion. In more advanced embodiments, a separate HARQ feedback may be used for one or more of the individual subframes.

Resource allocation grants sent using the PDCCH/EPDCCH can be modified. Currently, DCI formats used for PDSCH grants such as formats 1, 1A, 1B, 1C, 1D, 2, 2A, 2B, 2C, 2D, etc. contain 2-bit fields to indicate the RV for each transport block, a 1-bit New Data Indicator (NDI) field, and 3 or 4 bits to indicate the HARQ process number. In one embodiment, additional bits may be included to indicate a sequence of RVs using the same MCS that the UE may expect in successive subframes based on a single DCI. In another embodiment, the sequence of RVs may be pre-defined based on higher-layer signaling, while a new RNTI is used to scramble the DCI message. The use of this new RNTI indicates that preemptive retransmissions will be used for a particular downlink grant. In yet another embodiment, an additional bit field is introduced in the DCI messages applicable for successive subframe scheduling (e.g., DCI formats 0, 1, 1A, 1B, 1C, 1D, 2, 2A, 2B, 2C, 2D, 4, etc.), the bit field indicates whether the DCI message is valid for a single subframe or for a given number of successive subframes. In a modification, the bit field could indicate the number of successive subframes for which the DCI message is valid for. It is also evident that the indication of whether preemptive retransmissions will be used and the indication of the number of subframes/transmissions if preemptive transmissions will be used may be split into two different bit fields.

In an additional embodiment it is given that the RTT, i.e., the earliest subframe the UE expects a retransmission of after a successive subframe schedule is defined based on the last subframe in the successive scheduled subframe. For the case when FDD is the PCell, the time is 8 subframes. In case TDD is the PCell, the amount of subframes is 4+k subframes after the last subframe in the successive subframe scheduling, where k is the interval between the downlink transmission and the transmission of associated HARQ feedback as given in 3GPP Technical Specification (TS) 36.213 V12.3.0 (2014-09) in section 10.

In another embodiment, when the maximum allowed channel occupancy time for the transmission time is aligned with the subframes that the UE's corresponding onDurationTimer is running, when LBT for downlink transmission succeeds, the eNB can schedule the UEs that want to bring out of Discontinuous Reception (DRX) by scheduling them during the transmission burst that is aligned with the onDuration. Furthermore, in order to increase the number of UEs that are desired to come out of DRX, possibly by scheduling with short packets during the onDuration to those UEs, the number of out-of-DRX UEs is increased. However, by scheduling the RVs during the remaining part of the maximum transmission burst time interval, the channel can remain occupied as long as it is allowed.

Figure 11A:
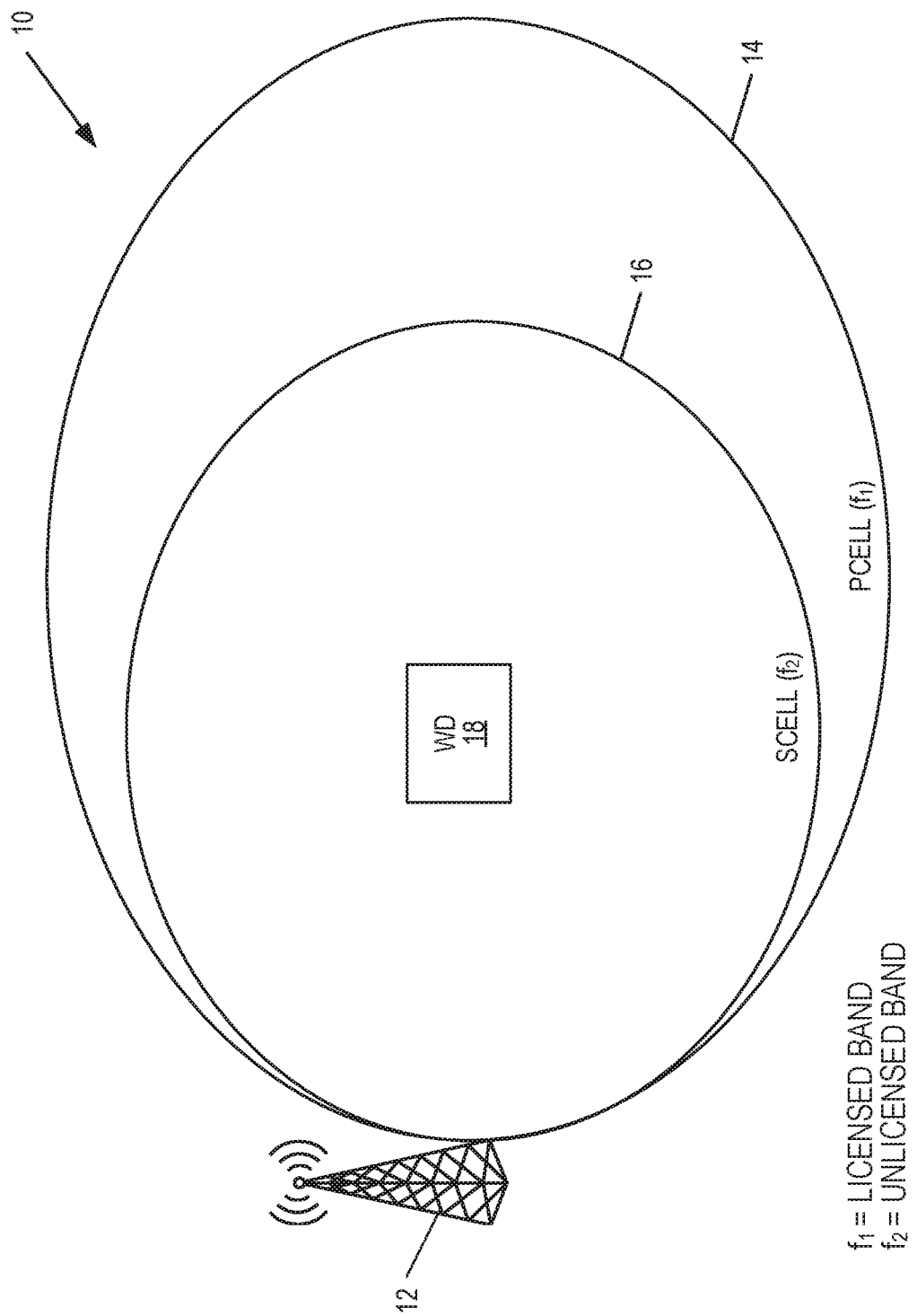
FIGS. 11A and 11B are schematic diagrams of two examples of a communications system in which preemptive transmissions are utilized on an LBT cell in accordance with embodiments of the present disclosure.
Figure 11B:
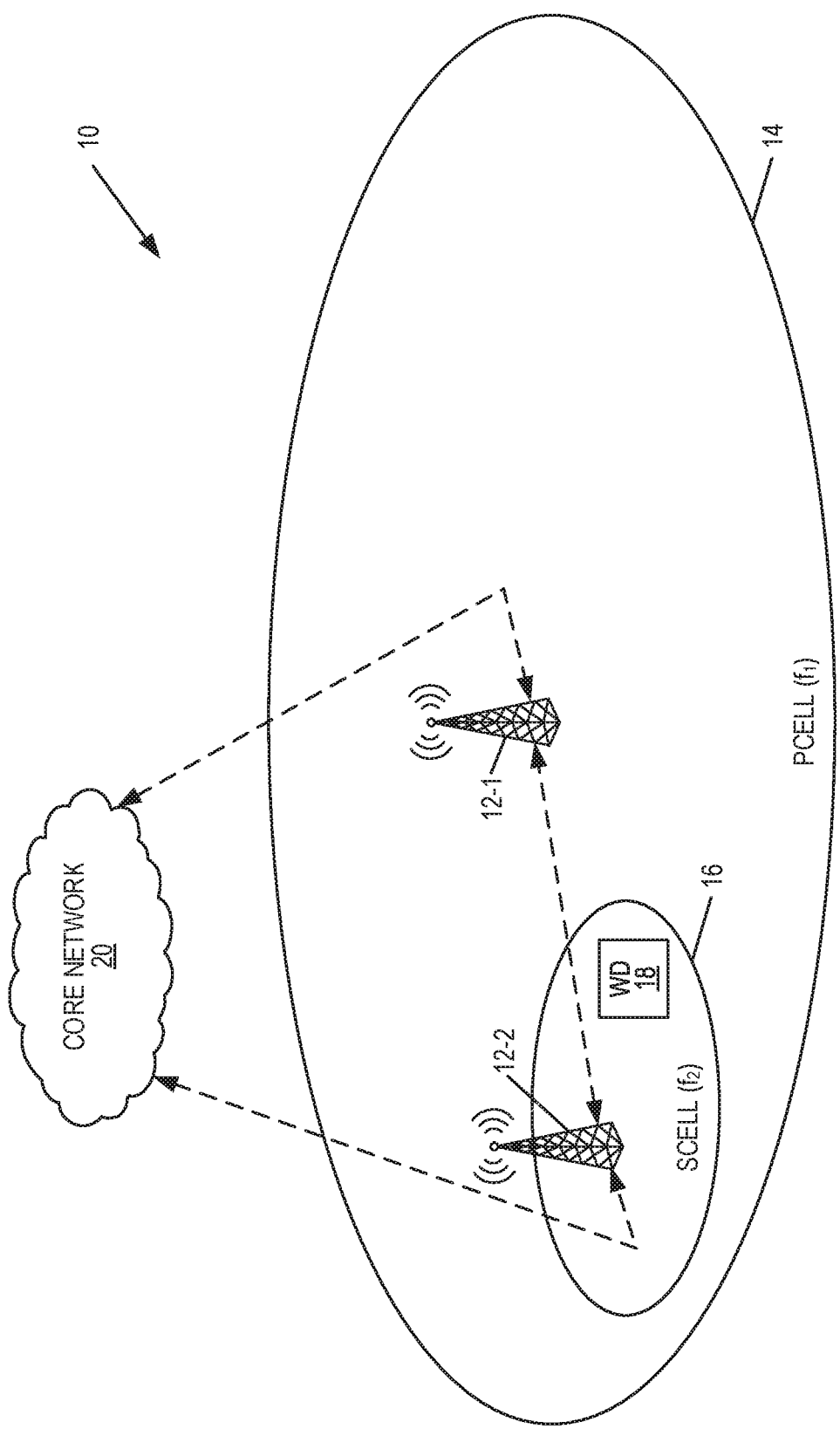

Embodiments of the present disclosure are implemented in a cellular communications network 10 (also referred to herein as a communications system), examples of which are illustrated in FIGS. 11A and 11B. In the example of FIG. 11A, the cellular communications network 10 includes a base station 12 (e.g., an eNB in LTE terminology) serving a cell 14 operating on a carrier $f_1$ in a licensed frequency spectrum and a cell 16 operating on a carrier $f_2$ in a unlicensed frequency spectrum (e.g., the 5 gigahertz (GHz) frequency spectrum). The cell 14 is configured as a PCell of a wireless device 18 (e.g., an LTE UE), and the cell 16 is configured as a SCell of the wireless device 18. As such, with respect to the wireless device 18, the cell 14 is referred to as the PCell 14 of the wireless device 18, and the cell 16 is referred to as the SCell 16 or, more precisely, the LAA SCell 16 of the wireless device 18.

While in the example of FIG. 11A the cells 14 and 16 are served by the same base station 12, the cells 14 and 16 may alternatively be served by separate base stations 12-1 and 12-2, respectively, as illustrated in FIG. 11B. The base stations 12-1 and 12-2 are communicatively connected to a core network 20 (e.g., an Evolved Packet Core (EPC)) and, in some embodiments, may communicate with one another either via a base-station-to-base-station interface (e.g., the X2 interface in LTE) or via the core network 20.

Figure 12:
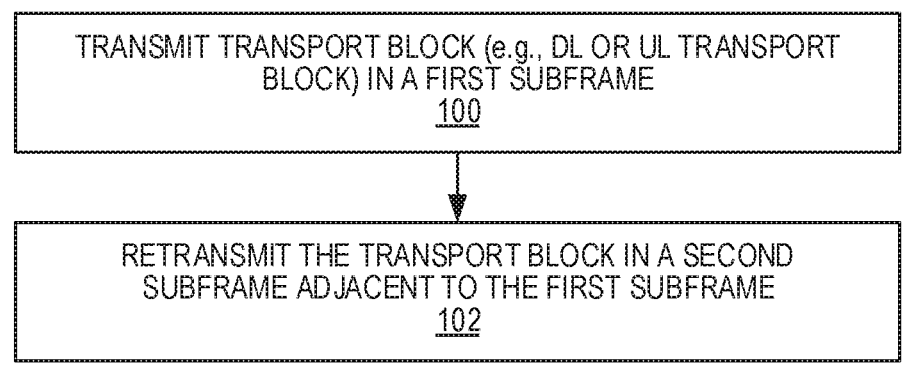
FIG. 12 is a flow chart that illustrates a process for preemptive retransmission on an LBT cell in accordance with some embodiments of the present disclosure.

FIG. 12 is a flow chart that illustrates the operation of a radio node according to some embodiments of the present disclosure. In general, the radio node provides transmission and (preemptive) retransmission of the same transport block in adjacent subframes on an LBT cell such as, for example, the LAA SCell 16. The radio node may be, for example, either (a) the base station 12 (FIG. 11A) or the base station 12-2 (FIG. 11B) performing downlink transmission on the LAA SCell 16 to the wireless device 18 or (b) the wireless device 18 performing uplink transmission on the LAA SCell 16.

As illustrated, the radio node transmits a transport block (e.g., a downlink transport block or an uplink transport block depending on the embodiment) in a first subframe on the LBT cell (e.g., the LAA SCell 16 of the wireless device 18) (step 100). The radio node then (preemptively) retransmits the same transport block in a second subframe that is adjacent to the first subframe (step 102). In other words, the radio node (preemptively) retransmits the same transport block in the next subframe on, e.g., the LBT cell. In many of the embodiments described herein, the second subframe is on the LBT cell (i.e., the same LBT cell as the transmission in the first subframe). However, in other embodiments, the second subframe is on a cell other than the LBT cell (e.g., another LAA SCell 16). Note that while FIG. 12 only shows a single retransmission, there may be additional retransmissions in the next subframes. For example, if the transmission of step 100 is performed in subframe #0 of a particular radio frame, then a first retransmission may be performed in subframe #1 of the same radio frame, a second retransmission may be performed in subframe #2 of the same radio frame, etc.

As discussed above, in some embodiments, the retransmission in the second subframe is a different RV of the transport block than that transmitted in the first subframe. Further, the retransmission in the second subframe uses, in some embodiments, different time-frequency resources within the second subframe than those used within the first subframe for the transmission of the transport block. For instance, different frequency resources (e.g., different subcarriers in LTE) may be used, different time resources (e.g., different Orthogonal Frequency Division Multiplexing (OFDM) symbol periods within the subframe in LTE), or both different frequency resources and different time resources may be used for the retransmission in step 102 than those for the transmission in step 100.

In some embodiments, a single resource allocation grant (e.g., a single resource allocation grant on an (E)PDCCH) is used to grant resources for both the original transmission as well as the retransmission(s) of the transport block. In other words, the transmission in step 100 is based on a corresponding resource allocation grant, and the retransmission in step 102 is based on the same resource allocation grant.

Figure 13:
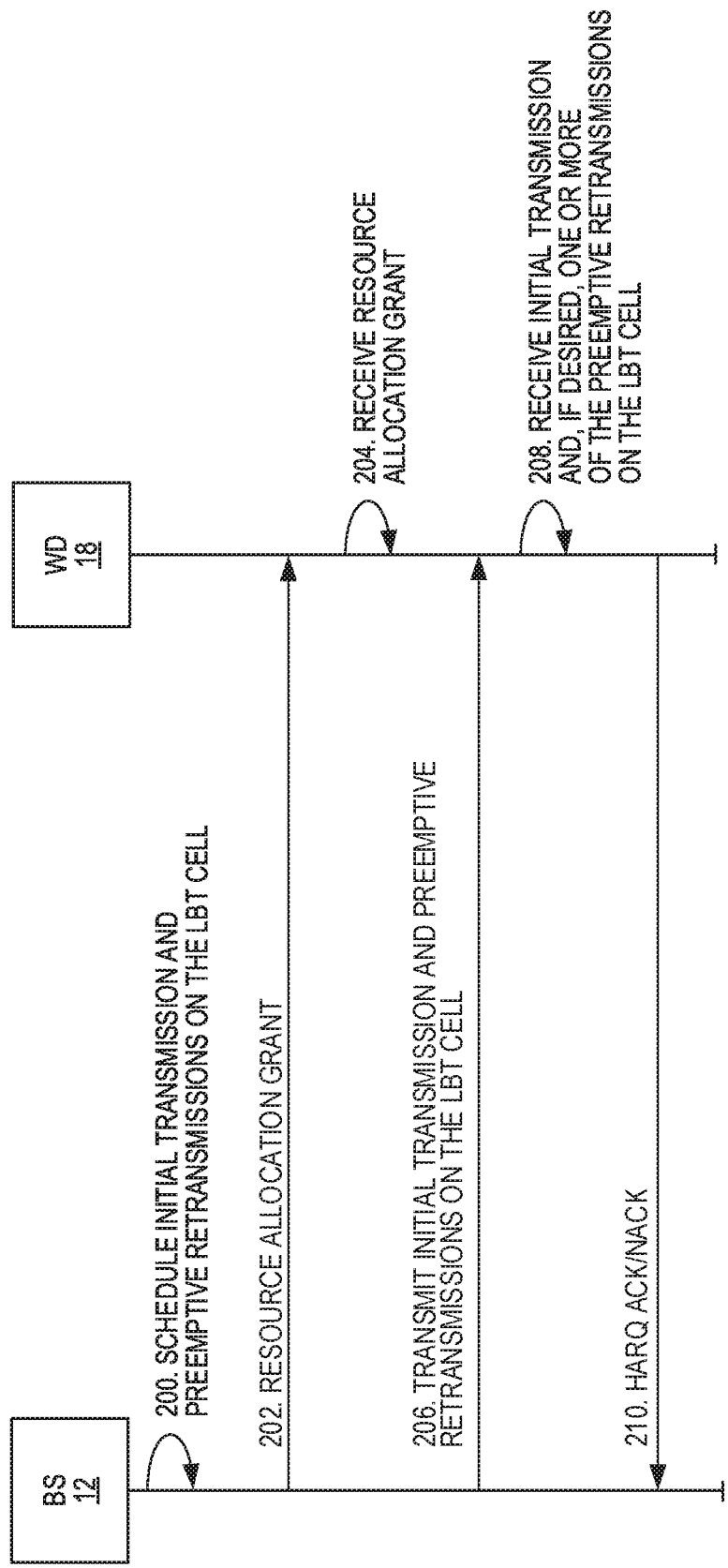
FIG. 13 illustrates the operation of the communications system of FIG. 11A with respect to preemptive downlink retransmissions in accordance with some embodiments of the present disclosure.

FIG. 13 illustrates the operation of the base station 12 and the wireless device 18 to provide preemptive downlink retransmission on the LAA SCell 16 as described above according to some embodiments of the present disclosure. As illustrated, in this example, the base station 12 schedules an initial transmission of a downlink transport block to the wireless device 18 and one or more preemptive transmissions of the same downlink transport block to the wireless device 18 on the LBT cell (e.g., on the LAA SCell 16) (step 200). This scheduling may be performed using any desired scheduling technique. As discussed above, the initial transmission of the downlink transport block is scheduled for a first subframe and the one or more retransmissions of the downlink transport block are scheduled in the next subframes. For example, if two retransmissions are scheduled, then the first retransmission is scheduled in a second subframe that is adjacent, in time, to the first subframe and the second retransmission is scheduled in a third subframe that is adjacent, in time, to the second subframe. In some embodiments, one or more of the retransmissions are scheduled on different time-frequency resources with the respective subframe than those on which the initial transmission is scheduled in the first subframe. The different time-frequency resources may be, for example, different frequency resources (i.e., different subcarriers in LTE) and/or different time resources (i.e., different OFDM symbol periods within the subframe in LTE). In addition, the retransmission(s) are, in some embodiments, scheduled as different RVs of the initial transmission of the transport block scheduled in the first subframe.

As discussed above, in some embodiments, the retransmission(s) are preemptively scheduled to prevent early release of the channel on the LBT cell, which in this example is the LAA SCell 16, due to, for example, an insufficient amount of data in the downlink buffer for the LAA SCell 16. Thus, in some embodiments, the scheduler for the LAA SCell 16 operates to schedule the preemptive retransmissions when, based on the amount of data in the downlink buffer for the LAA SCell 16, the LAA SCell 16 will release its channel, or is likely to release its channel, prior to the maximum channel occupancy time (i.e., the maximum duration for a single transmission burst due to regulatory restrictions). Further, the number of retransmissions may be selected such that the amount of time that the LAA SCell 16 has occupied the channel at the completion of the final retransmission is equal to the maximum channel occupancy time for the channel. Doing so would result in problems such as, for example, an unpredictable HARQ RTT since, once the channel is released, the LAA SCell 16 may not be able to transmit on the channel again for an indefinite amount of time, particularly where there is a high activity level in the unlicensed frequency spectrum.

The base station 12 transmits a single resource allocation grant to the wireless device 18 for the initial transmission of the downlink transport block and the one or more retransmissions of the downlink transport block in successive subframes (step 202). In some embodiments, the resource allocation grant is transmitted on the PCell 14 of the wireless device 18. As discussed above, in some embodiments, the resource allocation grant is sent using a PDCCH/EPDCCH on the PCell 14. Currently, DCI formats used for PDSCH grants such as formats 1, 1A, 1B, 1C, 1D, 2, 2A, 2B, 2C, 2D, etc. contain 2-bit fields to indicate the RV for each transport block, a 1-bit NDI field, and 3 or 4 bits to indicate the HARQ process number. In some embodiments, additional bits may be included to indicate a sequence of RVs using the same MCS that the wireless device 18 may expect in successive subframes based on a single DCI. This sequence of RVs corresponds to the initial transmission of the downlink transport block in one subframe and the retransmission(s) of the downlink transport block in the next subframe(s).

In other embodiments, the sequence of RVs may be predefined based on higher-layer signaling. Still further, in some embodiments, a new RNTI is used to scramble the DCI message. The use of this new RNTI indicates that preemptive retransmissions will be used for a particular downlink grant, e.g., according to the predefined sequence of RVs.

In other embodiments, an additional bit field is introduced in the DCI messages applicable for successive subframe scheduling (e.g., DCI formats 0, 1, 1A, 1B, 1C, 1D, 2, 2A, 2B, 2C, 2D, 4, etc.). The additional bit field indicates whether the DCI message is valid for a single subframe or for a given number of successive subframes. In one example modification, the bit field could indicate the number of successive subframes for which the DCI message is valid. Alternatively, the indication of whether the DCI message is valid for successive subframe scheduling and the number of successive subframes may be split into two different bit fields within the DCI message.

The wireless device 18 receives the resource allocation grant (step 204). Based on the resource allocation grant, the wireless device 18 expects the initial transmission of the downlink transport block and the retransmission(s) of the downlink transport block in the successive subframes for which they have been scheduled.

As discussed above particularly with respect to FIG. 10, in some embodiments, the PCell 14 and the LAA SCell 16 of the wireless device 18 are TDD cells in which some subframes are uplink subframes and some subframes are downlink subframes. Note that, as used herein, TDD includes dynamic TDD in which some subframes are "flexible" subframes that are dynamically configured as either downlink or uplink subframes. When the cells 14 and 16 are TDD cells, the cells 14 and 16 may, for example, have different uplink/downlink subframe configurations. As a result of the different uplink/downlink subframe configurations, a downlink subframe on the PCell 14 may correspond to an uplink subframe on the LAA SCell 16 and vice versa. Using cross-carrier scheduling, the resource allocation grant for the transmission and retransmission(s) of the downlink transport block on the LAA SCell 16 is transmitted in a special subframe or a downlink subframe of the PCell 14 that corresponds to a downlink subframe of the LAA SCell 16. Further, the next subframe(s) on the LAA SCell 16 during which the preemptive retransmission(s) are scheduled are also downlink subframes on the LAA SCell 16, but are not necessarily downlink or special subframes on the PCell 14. Thus, if the next subframes on the PCell 14 are uplink subframes, but for the scheduling of the preemptive retransmission(s), downlink transmissions would not be scheduled for the next subframe(s) on the LAA SCell 16.

The base station 12 transmits the initial transmission of the downlink transport block and the preemptive retransmission(s) of the downlink transport block on the LBT cell (e.g., the LAA SCell 16), as scheduled (step 206). Again, while in this example the retransmission(s) are transmitted on the LBT cell, in other embodiments the retransmission(s) may be transmitted on a cell other than the LBT cell. In this example, the LBT cell is the LAA SCell 16 of the wireless device 18, and the base station 12 transmits the initial transmission of the downlink transport block on the LAA SCell 16 in a first subframe (for which the initial transmission was scheduled) and the preemptive retransmission(s) of the downlink transport block on the LAA SCell 16 in the next subframe(s) (as scheduled).

The wireless device 18 receives the initial transmission and, if desired, one or more of the preemptive retransmissions of the downlink transport block on the LBT cell (step 208). Again, in this example, the LBT cell is the LAA SCell 16. Notably, while the wireless device 18 knows that the retransmission(s) are scheduled, the wireless device 18 does not necessarily need to receive them all, particularly if the wireless device 18 is able to successfully decode the downlink transport block prior to the final retransmission. However, in some embodiments, the MCS for the initial transmission and retransmission(s) is selected such that all or at least most of the retransmissions of the downlink transport block will be needed for successful decoding by the wireless device 18. In some embodiments, the wireless device 18 sends a HARQ ACK/NACK to the base station 12 to indicate whether the wireless device 18 was able to successfully receive and decode the downlink transport block using the initial transmission and the preemptive retransmission(s) (step 210).

Note that FIG. 13 describes the process with respect to the example of the cellular communications network 10 of FIG. 11A. However, the process is equally applicable to the example of the cellular communication network 10 of FIG. 11B where the cells 14 and 16 are served by different base stations 12-1 and 12-2. In that case, it should be noted that the resource allocation grant of step 202 is transmitted on the PCell 14 by the base station 12-1, whereas the initial transmission and retransmissions are transmitted on the LAA SCell 16 by the base station 12-2.

Figure 14:
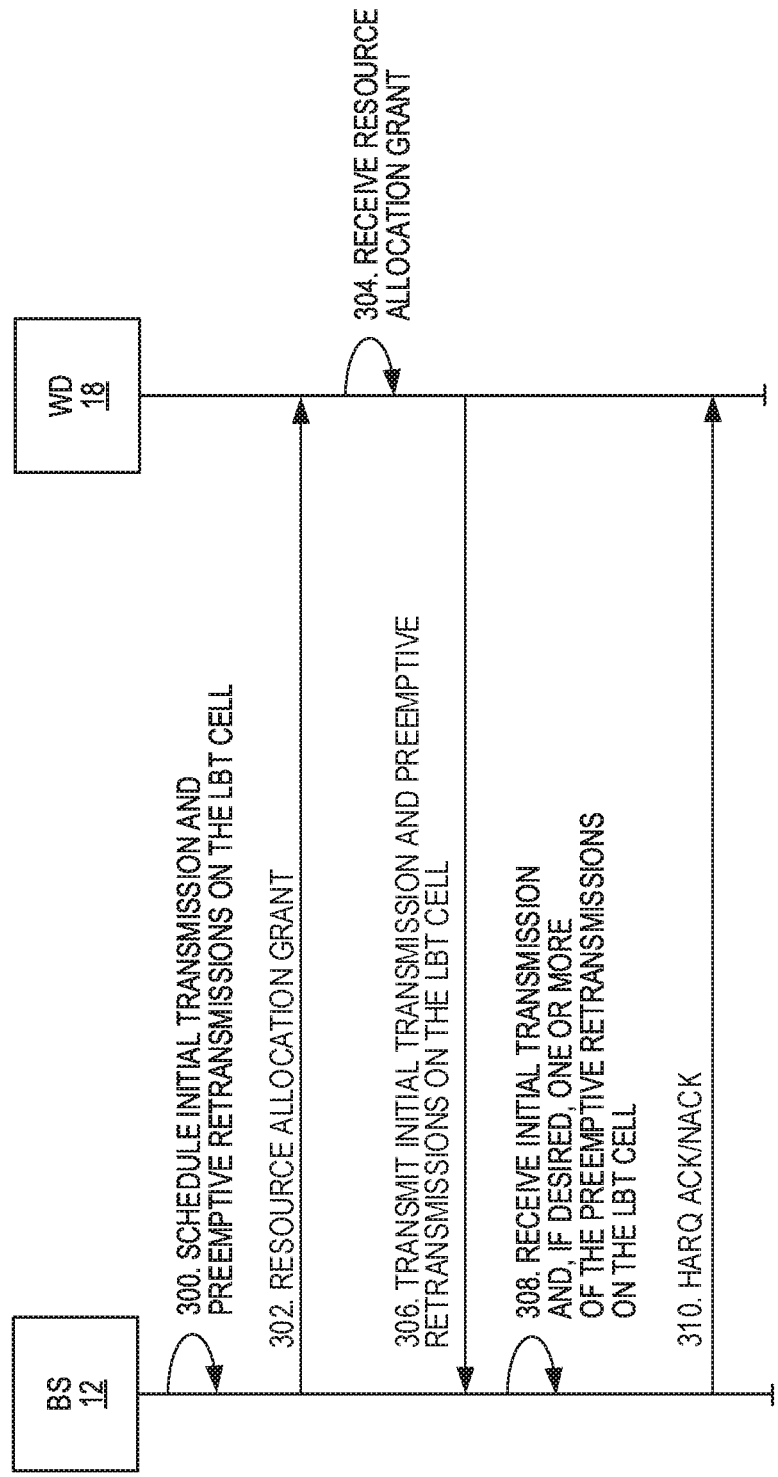
FIG. 14 illustrates the operation of the communications system of FIG. 11A with respect to preemptive uplink retransmissions in accordance with some embodiments of the present disclosure.

FIG. 14 illustrates the operation of the base station 12 and the wireless device 18 to provide preemptive uplink retransmission on the LAA SCell 16 as described above according to some embodiments of the present disclosure. As illustrated, in this example, the base station 12 schedules an initial transmission of an uplink transport block from the wireless device 18 and one or more preemptive transmissions of the same uplink transport block from the wireless device 18 on the LBT cell (e.g., on the LAA SCell 16) (step 300). This scheduling may be performed using any desired scheduling technique. As discussed above, the initial transmission of the uplink transport block is scheduled for a first subframe and the one or more retransmissions of the uplink transport block are scheduled in the next subframes. For example, if two retransmissions are scheduled, then the first retransmission is scheduled in a second subframe that is adjacent, in time, to the first subframe and the second retransmission is scheduled in a third subframe that is adjacent, in time, to the second subframe. In some embodiments, one or more of the retransmissions are scheduled on different time-frequency resources with the respective subframe than those on which the initial transmission is scheduled in the first subframe. The different time-frequency resources may be, for example, different frequency resources (i.e., different subcarriers in LTE) and/or different time resources (i.e., different OFDM symbol periods within the subframe in LTE). In addition, the retransmission(s) are, in some embodiments, scheduled as different RVs of the initial transmission of the transport block scheduled in the first subframe.

As discussed above, in some embodiments, the retransmission(s) are preemptively scheduled to prevent early release of the channel on the LBT cell, which in this example is the LAA SCell 16, due to, for example, an insufficient amount of data in the downlink buffer for the LAA SCell 16. Thus, in some embodiments, the scheduler for the LAA SCell 16 operates to schedule the preemptive retransmissions when, based on the amount of data in the uplink buffer for the wireless device 18 for the LAA SCell 16, the LAA SCell 16 will release its channel, or is likely to release its channel, prior to the maximum channel occupancy time. Further, the number of retransmissions may be selected such that the amount of time that the LAA SCell 16 has occupied the channel at the completion of the final retransmission is equal to the maximum channel occupancy time for the channel. Doing so would result in problems such as, for example, an unpredictable HARQ RTT since, once the channel is released, the LAA SCell 16 may not be able to transmit on the channel again for an indefinite amount of time, particularly where there is a high activity level in the unlicensed frequency spectrum.

The base station 12 transmits a single resource allocation grant to the wireless device 18 for the initial transmission of the uplink transport block and the one or more retransmissions of the uplink transport block in successive subframes (step 302). In some embodiments, the resource allocation grant is transmitted on the PCell 14 of the wireless device 18. For instance, the resource allocation grant may be transmitted using an appropriate DCI carrying an uplink grant. In some embodiments, additional bits may be included in the uplink grant to indicate a sequence of RVs using the same MCS that the wireless device 18 should use in successive subframes based on a single DCI. This sequence of RVs corresponds to the initial transmission of the uplink transport block in one subframe and the retransmission(s) of the uplink transport block in the next subframe(s).

In other embodiments, the sequence of RVs may be predefined based on higher-layer signaling. Still further, in some embodiments, a new RNTI is used to scramble the DCI message. The use of this new RNTI indicates that preemptive retransmissions will be used for a particular uplink grant, e.g., according to the predefined sequence of RVs.

In other embodiments, an additional bit field is introduced in the DCI messages applicable for successive subframe scheduling. The additional bit field indicates whether the DCI message is valid for a single subframe or for a given number of successive subframes. In one example modification, the bit field could indicate the number of successive subframes for which the DCI message is valid. Alternatively, the indication of whether the DCI message is valid for successive subframe scheduling and the number of successive subframes may be split into two different bit fields within the DCI message.

As discussed above particularly with respect to FIG. 10, in some embodiments, the PCell 14 and the LAA SCell 16 of the wireless device 18 are TDD cells in which some subframes are uplink subframes and some subframes are downlink subframes. Note that, as used herein, TDD includes dynamic TDD in which some subframes are "flexible" subframes that are dynamically configured as either downlink or uplink subframes. When the cells 14 and 16 are TDD cells, the cells 14 and 16 may, for example, have different uplink/downlink subframe configurations. As a result of the different uplink/downlink subframe configurations, a downlink subframe on the PCell 14 may correspond to an uplink subframe on the LAA SCell 16 and vice versa. Using cross-carrier scheduling, the resource allocation grant for the transmission and retransmission(s) of the uplink transport block on the LAA SCell 16 is transmitted in a special subframe of the PCell 14 that, in LTE, is four subframes prior to an uplink subframe of the LAA SCell 16 in which the wireless device 18 is to transmit the initial transmission of the uplink transport block. Further, the next subframe(s) on the LAA SCell 16 during which the preemptive retransmission(s) are scheduled are also uplink subframes on the LAA SCell 16, but do not necessarily have corresponding (four subframes earlier in LTE) downlink or special subframes on the PCell 14 in which uplink transmissions in those subframes on the LAA SCell 16 could normally be scheduled. If there are no special or downlink subframes on the PCell 14 that can (using normal scheduling) schedule uplink transmissions on the next subframes in the LAA SCell 16 (i.e., the subframes following the subframe in which the initial transmission of the uplink transport block by the wireless device 18 is scheduled), then, but for the scheduling of the preemptive retransmission(s), uplink transmissions would not be scheduled for the next subframe(s) on the LAA SCell 16.

The wireless device 18 receives the resource allocation grant (step 304). Based on the resource allocation grant, the wireless device 18 transmits the initial transmission of the uplink transport block and the preemptive retransmission(s) of the uplink transport block on the LBT cell (e.g., the LAA SCell 16), as scheduled (step 306). Again, while in this example the retransmission(s) are transmitted on the LBT cell, in other embodiments, the retransmission(s) may be transmitted on a cell other than the LBT cell. Note that, in a flexible TDD system, the retransmission(s) may be transmitted on true uplink subframes (i.e., subframes that are always uplink subframes) or on a flexible subframe that is configured as an uplink subframe. In this example, the LBT cell is the LAA SCell 16 of the wireless device 18, and the wireless device 18 transmits the initial transmission of the uplink transport block on the LAA SCell 16 in a first subframe (for which the initial transmission was scheduled) and the preemptive retransmission(s) of the uplink transport block on the LAA SCell 16 in the next subframe(s) (as scheduled).

The base station 12 receives the initial transmission and, if desired, one or more of the preemptive retransmissions of the uplink transport block on the LBT cell (step 308). Again, in this example, the LBT cell is the LAA SCell 16. Notably, while the base station 12 knows that the retransmission(s) are scheduled, the base station 12 does not necessarily need to receive them all, particularly if the base station 12 is able to successfully decode the uplink transport block prior to the final retransmission. However, in some embodiments, the MCS for the initial transmission and retransmission(s) is selected such that all or at least most of the retransmissions of the uplink transport block will be needed for successful decoding by the base station 12. In some embodiments, the base station 12 sends a HARQ ACK/NACK to the wireless device 18 to indicate whether the base station 12 was able to successfully receive and decode the uplink transport block using the initial transmission and the preemptive retransmission(s) (step 310).

Note that FIG. 14 describes the process with respect to the example of the cellular communications network 10 of FIG. 11A. However, the process is equally applicable to the example of the cellular communications network 10 of FIG. 11B where the cells 14 and 16 are served by different base stations 12-1 and 12-2. In that case, it should be noted that the resource allocation grant of step 302 is transmitted on the PCell 14 by the base station 12-1, whereas the initial transmission and retransmissions are received on the LAA SCell 16 by the base station 12-2.

Figure 15:
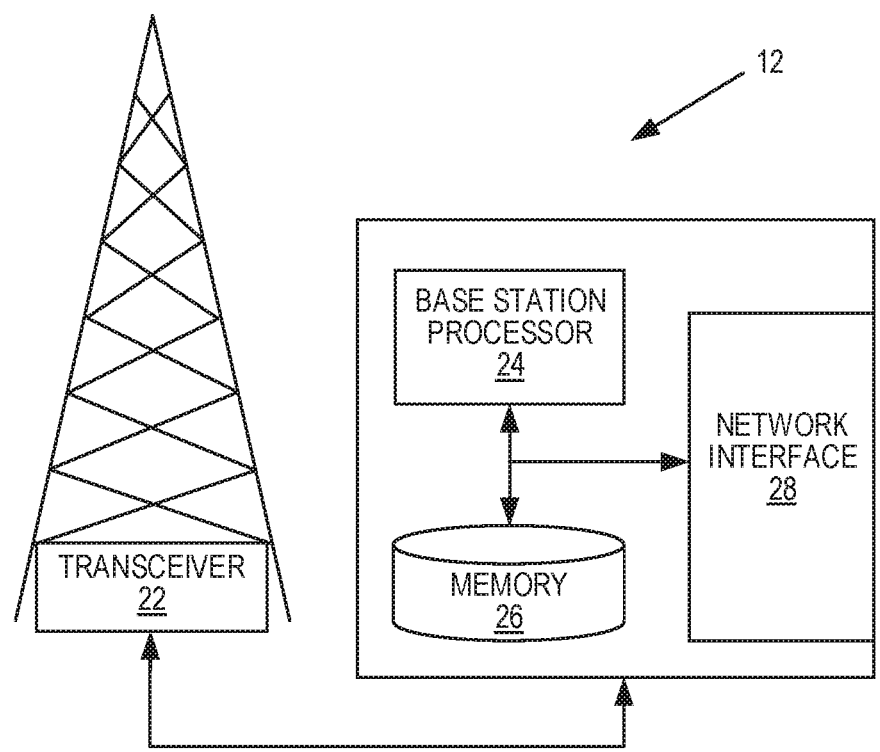
FIGS. 15 and 16 are schematic diagrams of a base station in accordance with some embodiments of the present disclosure.

FIG. 15 is schematic diagram of the base station 12 in accordance with some embodiments of the present disclosure. Note that this discussion is equally applicable to the base stations 12-1 and 12-2. The base station 12 can be an LTE base station (e.g., an eNB, a PCell base station) or another type of base station that can communicate wirelessly with the wireless device 18 (which, in LTE, may be a UE) (e.g., a SCell radio station operating in unlicensed spectrum). The base station 12 includes a transceiver 22, a processor 24 (e.g., one or more Central Processing Units (CPUs), one or more Application Specific Integrated Circuits (ASICs), one or more Field Programmable Gate Arrays (FPGAs), and/or the like), memory 26, and a network interface 28. The transceiver 22, which may include one or more transmitters and one or more receivers, allows the base station 12 to send and receive wireless signals. The processor 24 can execute instructions stored in the memory 26 based on signals received wirelessly via the transceiver 22. In particular, in some embodiments, the functionality of the base station 12 described herein is implemented in software that is stored in the memory 26 and executed by the processor 24. The network interface 28 allows the base station 12 to interact with a core network, such as sending and receiving signals from a wired link. The base station 12 can communicate wirelessly with one or more wireless devices 18.

In some embodiments, a computer program including instructions which, when executed by at least one processor, causes the at least one processor to carry out the functionality of the base station 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 16:
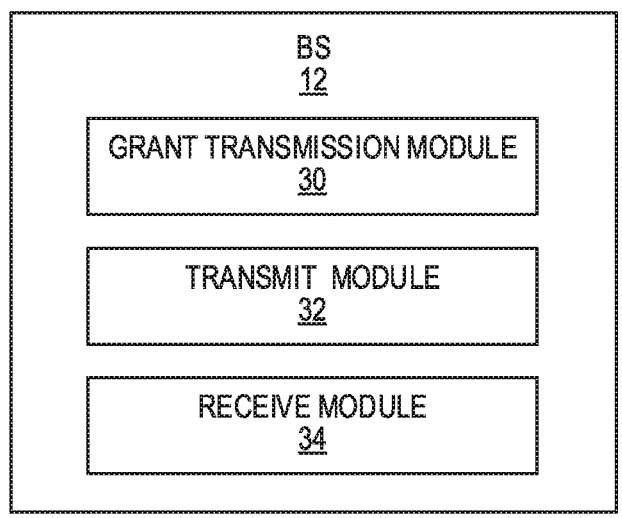

FIG. 16 illustrates the base station 12 according to some other embodiments of the present disclosure. Note that this discussion is equally applicable to the base stations 12-1 and 12-2. The base station 12 includes a grant transmission module 30, a transmit module 32, and a receive module 34, each of which is implemented in software. The grant transmission module 30 operates to transmit a single resource allocation grant for both the initial transmission and one or more retransmissions of a transport block on, e.g., the PCell 14 of the wireless device 18, as described above. In embodiments where the transmission and retransmissions are for a downlink transport block, the transmit module 32 operates to transmit (via an associated transceiver of the base station 12, which is not shown) the initial transmission and the one or more retransmissions of the downlink transport block, as described above. In other embodiments where the transmission and retransmission are for an uplink transport block, the receive module 34 operates to receive (via an associated transceiver of the base station 12, which is not shown) the initial transmission and, if needed or desired, one or more retransmissions of the uplink transport block from the wireless device 18, as described above.

Note that the base station 12 may not include all three modules 30, 32, and 34 in all embodiments. For instance, with respect to the base station 12-1, the base station 12-1 may include the grant transmission module 30 for transmitting the resource allocation grant, but may not include the transmit module 32 for transmitting the initial transmission and the retransmission(s) since these transmissions are performed by the base station 12-2, in the example embodiment of the cellular communications network 10 of FIG. 11B. In a similar manner, the base station 12-2 may include the transmit module 32 and/or the receive module 34, but may not include the grant transmission module 30 since, at least in some embodiments, the resource allocation grant is transmitted on the PCell 14 by the base station 12-1.

Figure 17:
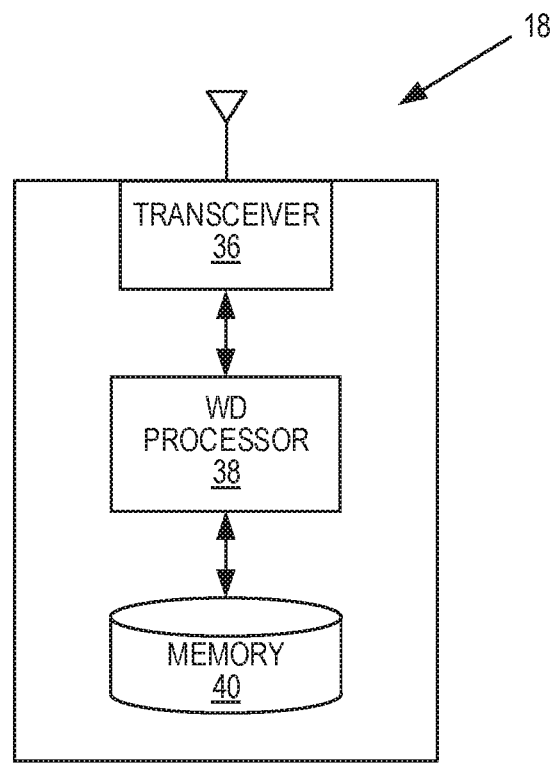
FIGS. 17 and 18 are schematic diagrams of a wireless device in accordance with some embodiments of the present disclosure.

FIG. 17 is a schematic diagram of the wireless device 18 in accordance with some embodiments of the present disclosure. The wireless device 18 is configured to send and receive wireless signals using resources from the licensed spectrum (e.g., the licensed LTE spectrum in the example embodiments described herein), the unlicensed spectrum, or both. The wireless device 18 includes a transceiver 36 including one or more transmitters and one or more receivers, a processor 38 (e.g., one or more CPUs, one or more ASICs, one or more FPGAs, and/or the like), and memory 40. The transceiver 36 allows the wireless device 18 to send and receive wireless signals. The processor 38 can execute instructions stored in the memory 40 based on signals received wirelessly via the transceiver 36. In particular, in some embodiments, the functionality of the wireless device 18 described herein is implemented in software that is stored in the memory 40 and executed by the processor 38.

In some embodiments, a computer program including instructions which, when executed by at least one processor, causes the at least one processor to carry out the functionality of the wireless device 18 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 18:
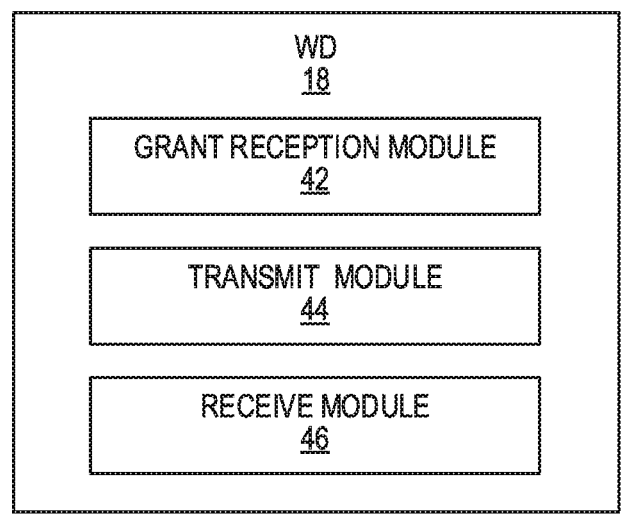

FIG. 18 illustrates the wireless device 18 according to some other embodiments of the present disclosure. The wireless device 18 includes a grant reception module 42, a transmit module 44, and a receive module 46, each of which is implemented in software. The grant reception module 42 operates to receive a single resource allocation grant for both the initial transmission and one or more retransmissions of a transport block on, e.g., the PCell 14 of the wireless device 18, as described above. In embodiments where the transmission and retransmissions are for an uplink transport block, the transmit module 44 operates to transmit (via an associated transceiver of the wireless device 18, which is not shown) the initial transmission and the one or more retransmissions of the uplink transport block, as described above. In other embodiments where the transmission and retransmission are for a downlink transport block, the receive module 46 operates to receive (via an associated transceiver of the wireless device 18, which is not shown) the initial transmission and, if needed or desired, one or more retransmissions of the downlink transport block, as described above.

Figure 19:
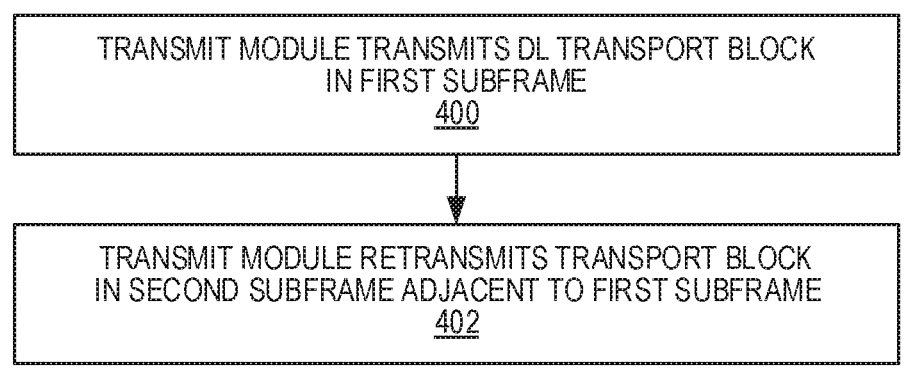
FIG. 19 is a flow chart that illustrates the operation of modules of a radio node to provide preemptive retransmission of a transport block on an LBT cell in accordance with some embodiments of the present disclosure.

FIG. 19 is a flow chart that illustrates the operation of modules of a radio node to provide preemptive retransmission of a transport block on an LBT cell in accordance with some embodiments of the present disclosure. In FIG. 19, the modules may be hardware modules, such as application specific circuitry, a general purpose processor, or a combination of hardware elements, such as a processor executing instructions stored on memory and a transceiver for transmitting wireless signals from an antenna system. The modules may also include software instructions encoded onto computer readable media. The modules may be configured to transmit a transport block in a subframe based on a downlink grant (step 400). The modules may be configured to retransmit the transport block in the subsequent subframe based on the first downlink grant (step 402). The retransmitted transport block may have a different RV than the original transmission. Note that similar modules may be utilized for an uplink embodiment.

The following acronyms are used throughout this disclosure.

Ms Microsecond
3GPP Third Generation Partnership Project
ACK Acknowledgement
AP Access Point
ASIC Application Specific Integrated Circuit
CA Carrier Aggregation
CC Component Carrier
CCA Clear Channel Assessment
CFI Control Format Indicator
CIF Carrier Indicator Field
CPU Central Processing Unit
CRS Cell Specific Reference Symbol
CSMA/CA Carrier Sense Multiple Access with Collision Avoidance
DCI Downlink Control Information
DFT Discrete Fourier Transform
DRX Discontinuous Reception
eIMTA Enhanced International Mobile Telecommunications Advanced
eNB Enhanced or Evolved Node B
EPC Evolved Packet Core
EPDCCH Enhanced Physical Downlink Control Channel
FDD Frequency Division Duplexing
FDMA Frequency Division Multiple Access
FPGA Field Programmable Gate Array
GHz Gigahertz
HARQ Hybrid Automatic Repeat Request
LAA License Assisted Access
LBT Listen-Before-Talk
LTE Long Term Evolution
MCS Modulation and Coding Scheme
MHz Megahertz
ms Millisecond
MTC Machine Type Communication
NACK Negative Acknowledgement
NDI New Data Indicator
OFDM Orthogonal Frequency Division Multiplexing
PCell Primary Cell
PDCCH Physical Downlink Control Channel
PDSCH Physical Downlink Shared Channel
PUCCH Physical Uplink Control Channel
PUSCH Physical Uplink Shared Channel
RBG Resource Block Group
Rel-8 Release 8
Rel-10 Release 10
Rel-11 Release 11
Rel-12 Release 12
RNTI Radio Network Temporary Identifier
RTT Round-Trip Time
RV Redundancy Version
SCell Secondary Cell
SC-FDMA Single Carrier Frequency Division Multiple Access
TDD Time Division Duplexing
TS Technical Specification
TTI Transmit Time Interval
UE User Equipment
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a radio node of a cellular communications network, the radio node serving a Listen-Before-Talk, LBT, cell, comprising:
    transmitting a transport block in a first subframe on the LBT cell; and
    retransmitting the transport block in a second subframe, the second subframe being adjacent, in time, to the first subframe, wherein retransmitting the transport block in the second subframe comprises preemptively retransmitting the transport block in the second subframe according to a Hybrid Automatic Repeat Request, HARQ, procedure using frequency resources within the second subframe that are different than frequency resources used for transmission of the transport block within the first subframe without first receiving an indication that retransmission of the transport block transmitted in the first subframe is needed when a channel on which the radio node is transmitting would have otherwise been released.

2. The method of claim 1 wherein retransmitting the transport block in the second subframe comprises preemptively retransmitting the transport block in the second subframe without first receiving an indication that retransmission of the transport block transmitted in the first subframe is needed.

3. The method of claim 1 wherein retransmitting the transport block in the second subframe comprises transmitting a redundancy version of the transport block in the second subframe that is different than that transmitted in the first subframe.

4. The method of claim 1 wherein retransmitting the transport block in the second subframe comprises retransmitting the transport block in the second subframe using time-frequency resources within the second subframe that are different than time-frequency resources used for transmission of the transport block within the first subframe.

5. The method of claim 1 wherein the radio node is a radio access node, transmitting the transport block in the first subframe comprises transmitting a downlink transport block to a wireless device in the first subframe, and retransmitting the transport block in the second subframe comprises retransmitting the downlink transport block to the wireless device in the second subframe.

6. The method of claim 5 further comprising:
transmitting a single resource allocation grant for transmission of the downlink transport block in the first subframe and retransmission of the downlink transport block in the second subframe.

7. The method of claim 6 wherein transmitting the single resource allocation grant comprises transmitting the single resource allocation grant on a cell other than the LBT cell.

8. The method of claim 7 wherein the cell is a primary cell with respect to downlink carrier aggregation for the wireless device, and the LBT cell is a secondary cell with respect to downlink carrier aggregation for the wireless device.

9. The method of claim 8 wherein the primary cell operates in a licensed frequency spectrum.

10. The method of claim 1 wherein the radio node is a wireless device, transmitting the transport block in the first subframe comprises transmitting an uplink transport block to a radio access node in the first subframe, and retransmitting the transport block in the second subframe comprises retransmitting the uplink transport block to the radio access node in the second subframe.

11. The method of claim 10 further comprising:
receiving a single resource allocation grant for transmission of the uplink transport block in the first subframe and retransmission of the uplink transport block in the second subframe.

12. The method of claim 11 wherein receiving the single resource allocation grant comprises receiving the single resource allocation grant on a cell other than the LBT cell.

13. The method of claim 12 wherein the cell is a primary cell with respect to downlink carrier aggregation for the wireless device, and the LBT cell is a secondary cell with respect to downlink carrier aggregation for the wireless device.

14. The method of claim 13 wherein the primary cell operates in a licensed frequency spectrum.

15. The method of claim 6 wherein the single resource allocation grant for transmission of the transport block in the first subframe and retransmission of the transport block in the second subframe comprises an indication of a sequence of redundancy versions of the transport block that the wireless device is to expect in successive subframes comprising the first subframe and the second subframe.

16. The method of claim 6 wherein the single resource allocation grant for transmission of the transport block in the first subframe and retransmission of the transport block in the second subframe is comprised in a Downlink Control Information, DCI, message that is scrambled with a Radio Network Temporary Identifier, RNTI, that indicates that preemptive retransmissions will be used for the single resource allocation grant.

17. The method of claim 16 wherein a number of preemptive transmissions in successive subframes for the single resource allocation grant is predefined.

18. The method of claim 6 wherein the single resource allocation grant for transmission of the transport block in the first subframe and retransmission of the transport block in the second subframe comprises an indication that the single resource allocation grant is valid for multiple successive subframes comprising the first subframe and the second subframe.

19. The method of claim 1 wherein:
both transmission of the transport block in the first subframe and retransmission of the transport block in the second subframe are scheduled by a single resource allocation grant that is provided on a cell other than the LBT cell;
the cell on which the single resource allocation grant is provided and the LBT cell are Time Division Duplexing, TDD, cells in which transmissions in a particular subframe on the LBT cell are normally scheduled by resource allocation grants transmitted in a corresponding downlink subframe on the cell; and
the second subframe is a subframe on the LBT cell on which transmissions could normally not be scheduled because a corresponding subframe on the cell is an uplink subframe.

20. The method of claim 1 wherein retransmitting the transport block comprises retransmitting the transport block in one or more additional subframes on the LBT cell, where the one or more additional subframes are adjacent, in time, to one another and the one or more additional subframes comprise the second subframe that is adjacent, in time, to the first subframe.

21. The method of claim 20 wherein the one or more additional subframes further comprise a third subframe that is adjacent, in time, to the second subframe.

22. The method of claim 20 wherein a number of the one or more additional subframes is variable.

23. The method of claim 22 wherein the number of the one or more additional subframes is defined by higher-layer signaling.

24. The method of claim 20 wherein the one or more additional subframes comprises two or more additional subframes, and retransmitting the transport block in the one or more additional subframes comprises transmitting a different redundancy version of the transport block in each of the two or more additional subframes.

25. The method of claim 20 wherein retransmitting the transport block in the one or more additional subframes comprises retransmitting the transport block in the one or more additional subframes on the LBT cell such that transmission on the LBT cell by the radio node reaches a maximum allowed occupancy time for the LBT cell.

26. The method of claim 1 wherein retransmitting the transport block in the second subframe comprises retransmitting the transport block in the second subframe on the LBT cell.

27. The method of claim 1 wherein retransmitting the transport block in the second subframe comprises retransmitting the transport block in the second subframe on a cell other than the LBT cell.

28. The method of claim 1 wherein the LBT cell is a License Assisted Access, LAA, secondary cell.

29. The method of claim 1 wherein the LBT cell is a standalone LBT cell.

30. The method of claim 1, wherein the preemptive retransmitting of the transport block in the second subframe according to the HARQ procedure enables a HARQ Round-Trip Time, RTT, to be reduced.

31. A radio node of a cellular communications network, the radio node serving a Listen-Before-Talk, LBT, cell, comprising:
   one or more transmitters;
   a processor; and
   memory containing instructions executable by the processor whereby the radio node is operable to:
   transmit, via the one or more transmitters, a transport block in a first subframe on the LBT cell; and
   retransmit, via the one or more transmitters, the transport block in a second subframe, the second subframe being adjacent, in time, to the first subframe, wherein the radio node is operable to preemptively retransmit the transport block in the second subframe according to a Hybrid Automatic Repeat Request, HARQ, procedure using frequency resources within the second subframe that are different than frequency resources used for transmission of the transport block within the first subframe without first receiving an indication that retransmission of the transport block transmitted in the first subframe is needed when a channel on which the radio node is transmitting would have otherwise been released.

32. The radio node of claim 31 wherein the transport block is retransmitted in the second subframe on the LBT cell.

33. The radio node of claim 31 wherein the transport block is retransmitted in the second subframe on a cell other than the LBT cell.

34. The radio node of claim 31, wherein the radio node is further operable to reduce a HARQ Round-Trip Time, RTT, by the preemptive retransmitting of the transport block in the second subframe according to the HARQ procedure.

* * * * *